(12) United States Patent
Takeuchi et al.

(10) Patent No.: US 7,145,938 B2
(45) Date of Patent: Dec. 5, 2006

(54) APPARATUS PRODUCING CONTINUOUS STREAM OF CORRELATION VALUES

(75) Inventors: Masatsugu Takeuchi, Sendai (JP); Morihiko Minowa, Kawasaki (JP); Noriyuki Kawaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 934 days.

(21) Appl. No.: 09/734,856

(22) Filed: Dec. 12, 2000

(65) Prior Publication Data
US 2001/0004378 A1      Jun. 21, 2001

(30) Foreign Application Priority Data
Dec. 14, 1999   (JP)   .................................. 11-353923

(51) Int. Cl.
H04B 1/69      (2006.01)
H04B 1/707     (2006.01)

(52) U.S. Cl. .................... 375/147; 375/150; 375/152

(58) Field of Classification Search ........ 375/130–153, 375/206, 205, 316, 343; 370/18, 19, 20, 370/110, 342; 364/728, 715
See application file for complete search history.

(56) References Cited

U.S. PATENT DOCUMENTS

| | | | | |
|---|---|---|---|---|
| 3,670,151 A | * | 6/1972 | Lindsay et al. | 708/425 |
| 4,559,606 A | * | 12/1985 | Jezo et al. | 708/425 |
| 4,660,164 A | * | 4/1987 | Leibowitz | 708/422 |
| 5,237,586 A | * | 8/1993 | Bottomley | 370/206 |
| 5,528,624 A | * | 6/1996 | Kaku et al. | 375/148 |
| 5,715,276 A | * | 2/1998 | Tran et al. | 375/152 |
| 5,966,411 A | * | 10/1999 | Struhsaker | 375/332 |
| 5,999,562 A | * | 12/1999 | Hennedy et al. | 375/152 |
| 6,094,449 A | * | 7/2000 | Komatsu | 375/136 |
| 6,212,219 B1 | * | 4/2001 | Shou et al. | 375/130 |

FOREIGN PATENT DOCUMENTS

| | | |
|---|---|---|
| EP | 0 939 500 | 9/1999 |
| GB | 2 315 647 | 2/1998 |
| WO | 97/02675 | 1/1997 |
| WO | 99/41846 | 8/1999 |

OTHER PUBLICATIONS

U.S. Appl. No. 09/322,444, filed May 1999, Minowa et al.*
Official Communication dated Feb. 23, 2005.
European Search Report dated Feb. 24, 2005.

* cited by examiner

*Primary Examiner*—Chieh M. Fan
*Assistant Examiner*—Jason M. Perilla
(74) *Attorney, Agent, or Firm*—Katten Muchin Rosenman LLP

(57) ABSTRACT

An apparatus includes a plurality of received-signal registers which receive and store therein a plurality of respective received-signal sequences, a selector which selects one of the received signal sequences stored in the received-signal registers, at least one code register which stores therein a de-spreading-code sequence, a multiplication circuit which multiplies the selected one of the received-signal sequences by the de-spreading-code sequence, and a summation circuit which obtains a sum of results of the multiplication to obtain a correlation between the selected one of the received-signal sequences and the de-spreading-code sequence.

7 Claims, 18 Drawing Sheets

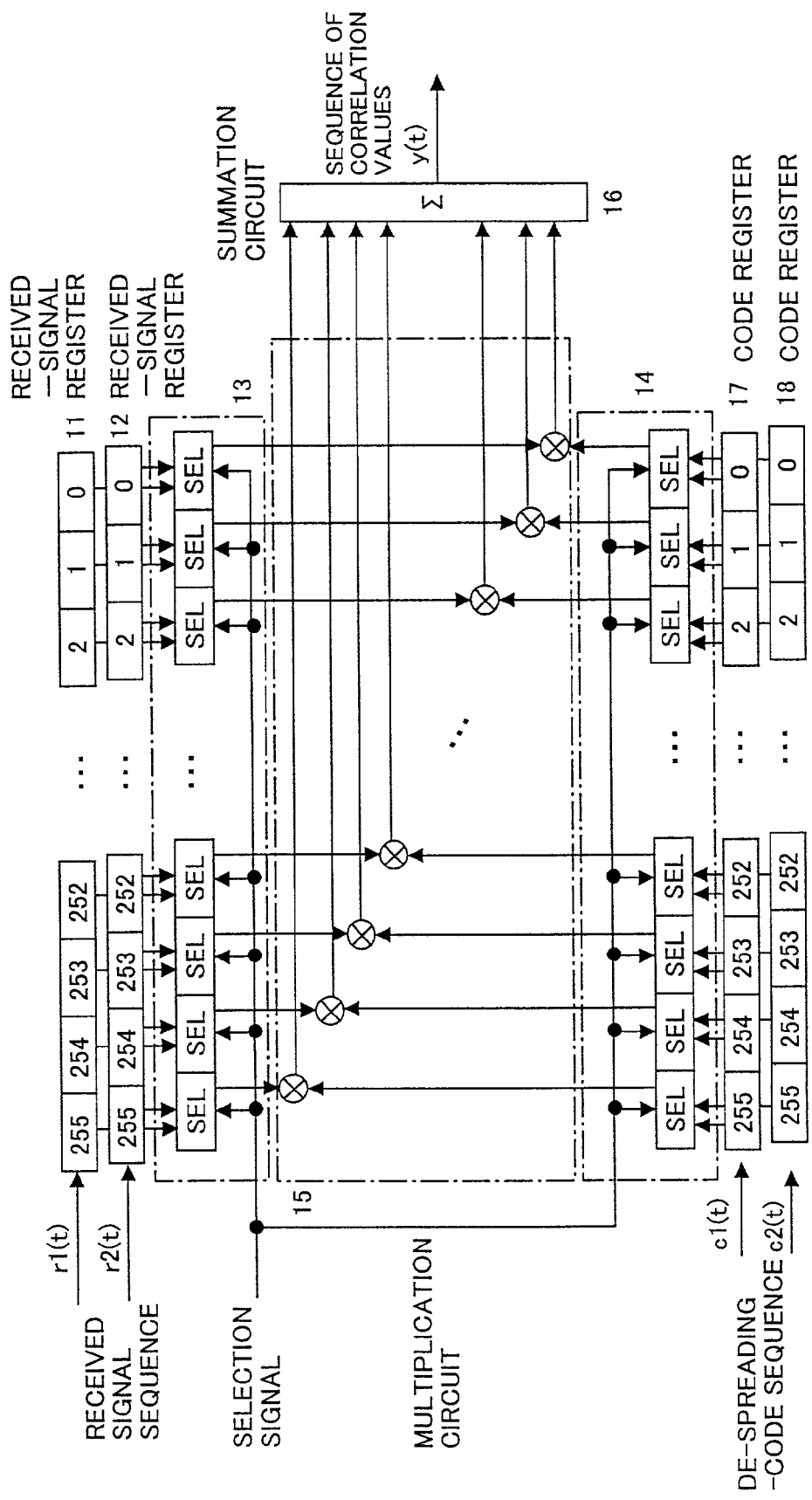

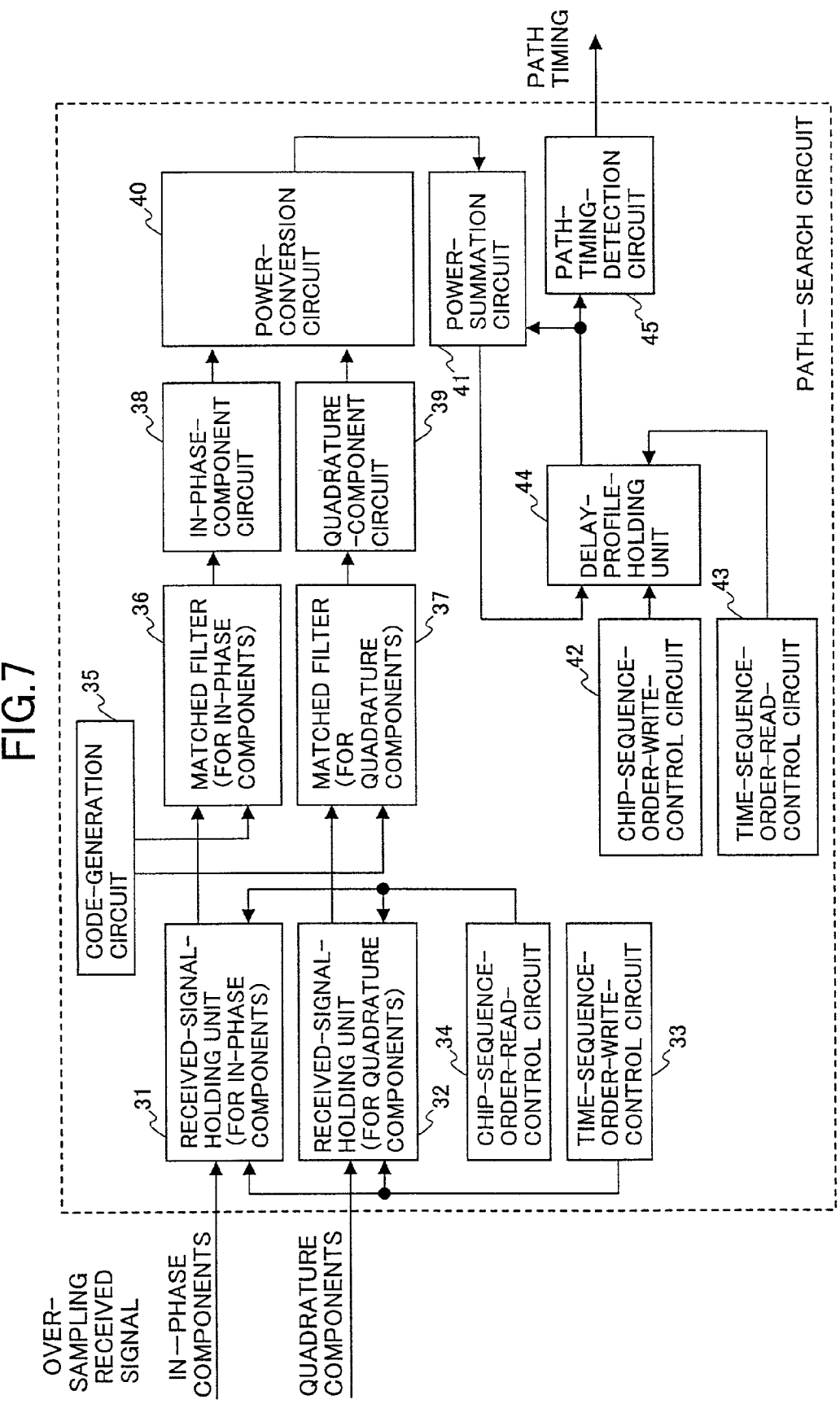

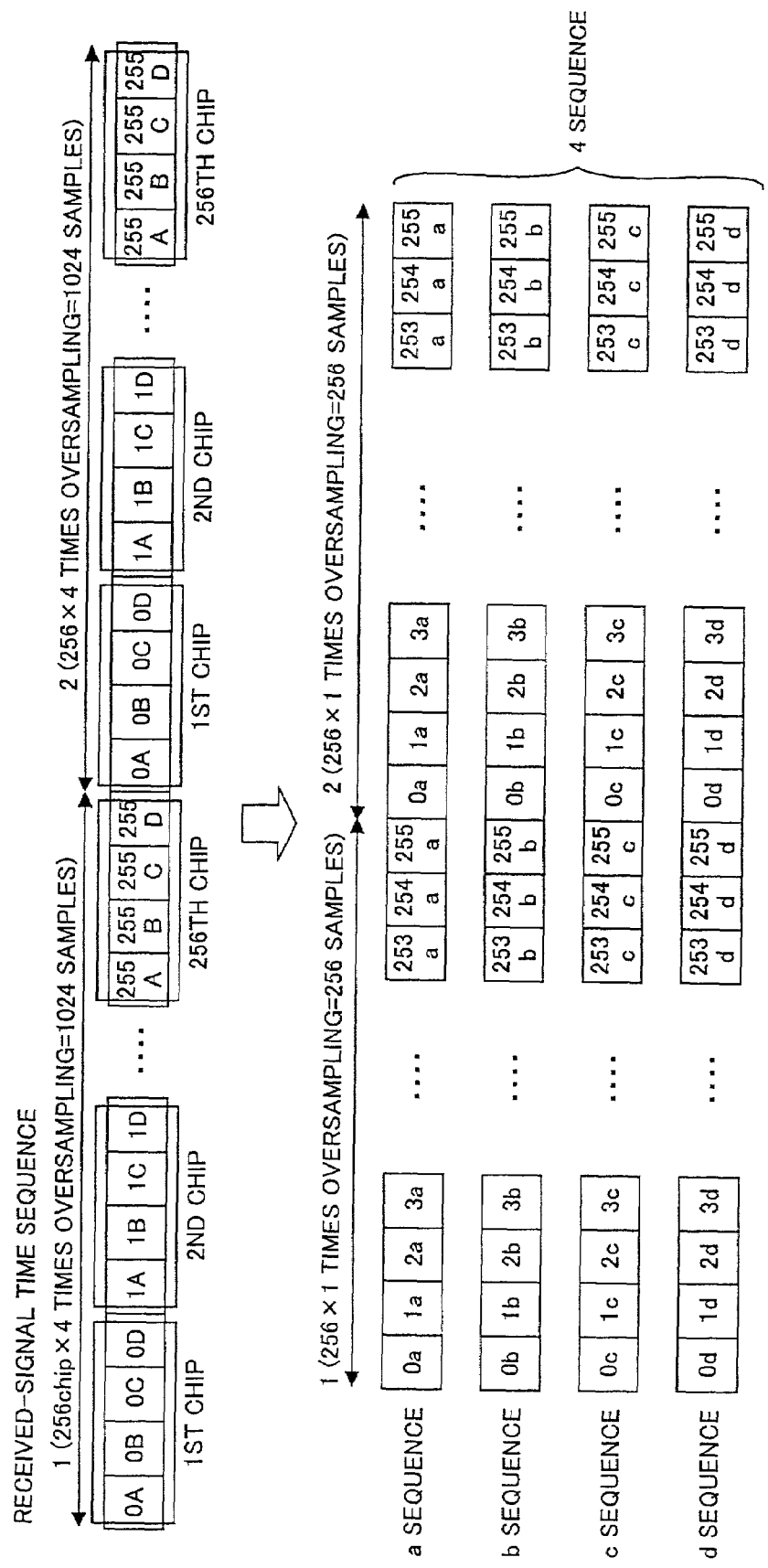

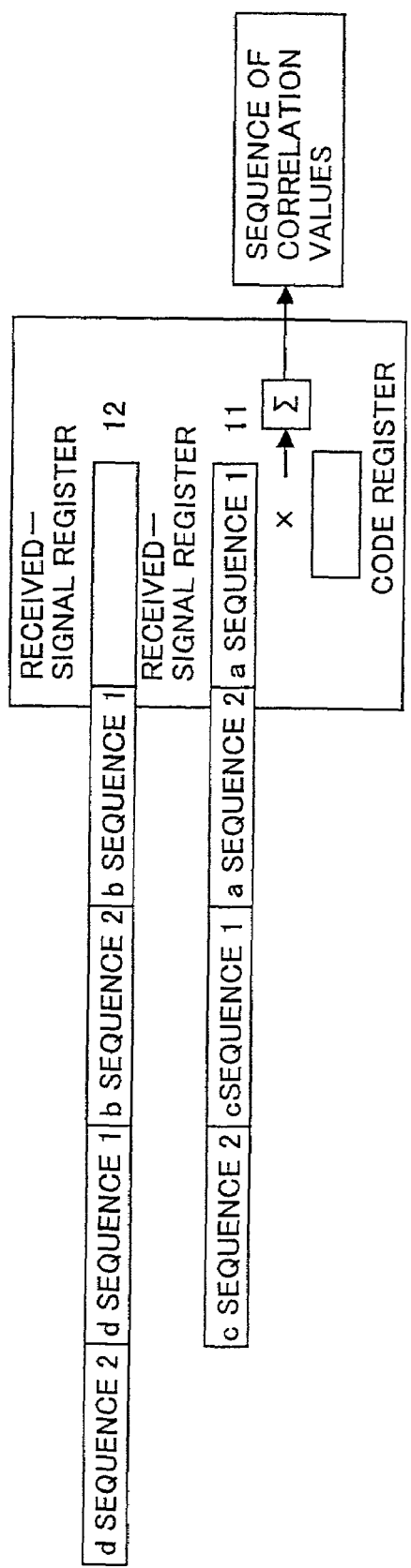
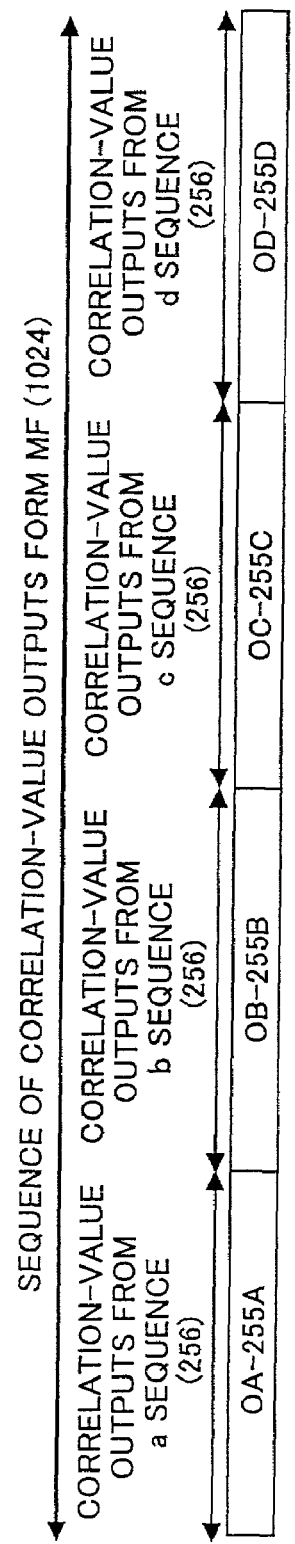
FIG.9A
FIG.9B

APPARATUS PRODUCING CONTINUOUS STREAM OF CORRELATION VALUES

BACKGROUND OF THE INVENTION

1. Field of the Invention

The present invention generally relates to a receiver used in a communication system employing the CDMA (code division multiple access) scheme, and particularly relates to a path-search circuit used in the receiver wherein the path-search circuit establishes synchronization by detecting a peak (path timing) of a delay profile of a received signal, and maintains the synchronization.

2. Description of the Related Art

FIG. 15 is a block diagram showing a related-art path-search circuit.

A code-spreading modulated signal is received by an antenna, and is supplied to a QPSK modulator 102 via a band-bass filter 101. The QPSK modulator 102 demodulates the received signal, and supplies in-phase components and quadrature components to A/D converters 105 and 106 via low-pass filters 103 and 104, respectively. The demodulated signals are converted into digital signals comprised of X bits. XX upper bits of these X bits, for example, are input to a path-search circuit 107. Here, the digital signals having all the X bits may be input to the path-search circuit 107. Use of the XX upper bits of the X bits, however, can reduce circuit size while incurring almost no degradation in path-search accuracy.

The path-search circuit 107 includes received-signal-holding units 111 and 112 comprised of memories or the like, a write-control circuit 113, a read-control circuit 114, a code-generation circuit 115, matched filters 116 and 117, in-phase-summation circuits 118 and 119, a power-conversion circuit 120, a power-summation circuit 121, a write-control circuit 122, a read-control circuit 123, a delay-profile-holding unit 124 comprised of a memory or the like, and a path-timing-detection circuit 125.

The received-signal-holding units 111 and 112 hold in-phase components of the received signals and quadrature components of the received signals, and supply them to the matched filters 116 and 117, respectively. The matched filters 116 and 117 obtain correlation with de-spreading code sequences supplied from the code-generation circuit 115. Then, the in-phase-summation circuits 118 and 119 add together correlation values having small phase differences, and the power-conversion circuit 120 obtains electrical power through calculation of squares. The power is repeatedly added over predetermined time periods by the power-summation circuit 121 and the delay-profile-holding unit 124, so that an average over time sequence is obtained. The path-timing-detection circuit 125 detects a peak point of the delay profile to output a path-timing signal.

FIG. 16 is an illustrative drawing for explaining operation of a related-art matched filter. FIG. 16 shows a main portion of either one of the matched filters 116 and 117 shown in FIG. 15. As shown, the matched filter includes a received-signal register 131, a code register 132, multiplication units 133, and a summation circuit 134. This configuration corresponds to a case in which a spreading factor m is 256, and an over-sample ratio k relative to the chip rate is four.

When the received-signal register 131 receives a received-signal sequence comprised XX bits as described above, the received-signal register 131 may be configured as a shift register having a 4-bit-parallel-shift configuration and comprised of 1024 stages in total (m×k=1024). The code register 132 is then a shift register having 256 stages (m=256), and there are multiplication units 133 as many as 256 to make up a multiplication circuit. A received-signal sequence r(t) corresponding to every fourth stage of the received-signal register 131 is multiplied by the de-spreading-code sequence c(t) corresponding to every stage of the code register 132. Results of multiplications obtained as outputs of the 256 multiplication units 133 are added together by the summation circuit 134, thereby producing a correlation value at the given timing. The received-signal sequence r(t) is shifted at high speed in the received-signal register 131, and is multiplied by the de-spreading-code sequence, with the results of multiplications being summed again by the summation circuit 134. In this manner, a correlation-value sequence y(t) is obtained. A peak point of a delay profile that is a time average of the correlation-value sequence y(t) is then obtained as a path timing.

FIGS. 17A through 17D are illustrative drawing for explaining detection of correlation values in received signals that are diffused by use of identical codes.

In the space-diversity scheme using a plurality of antennas or in a system having antennas for respective sectors, it is the most general practice to provide receiver units including path-search circuits such that the path-search circuits correspond to the respective antennas. This configuration has a drawback in that the circuit size increases in proportion to the number of antennas. In order to facilitate shared use, a single circuit may be used in a time-divided fashion. For example, a signal received by a first antenna and a signal received by a second antenna have different phases and amplitudes, and are supplied to the one and same received-signal register of a matched filter on a time-divided basis, thereby outputting a correlation value.

FIG. 17A shows a situation in which the first symbol S11 of the signal received by the first antenna is input to the received-signal register. The input symbol is shifted thereafter, and the second symbol S12 is input to the received-signal register as shown in FIG. 17B. The first symbol S11 is multiplied by a de-spreading code of the first symbol S11 stored in the code register, and a result of the multiplication is summed together by the summation circuit to produce a correlation-value sequence having a length of one symbol.

FIG. 17C shows a situation in which the signal received by the second antenna is input to the received-signal register. When the first symbol S21 is input to the received-signal register, it is necessary to make sure that the preceding signals corresponding to the first antenna do not affect correlation computation for the second antenna signal. FIG. 17D shows a situation in which the first symbol S12 of the signal received by the second antenna is input to the received-signal register. From this instance, multiplication of the signal received by the second antenna by the de-spreading codes thereof stored in the code register proceeds, with the results of the multiplication being summed together by the summation circuit to produce a correlation value.

FIGS. 18A through 18D are illustrative drawings for explaining detection of correlation values having a length of two symbols for sequences of different codes.

Symbols S1 through S3 of a received-signal sequence are multiplied by a de-spreading code C1, and symbols S2 through S4 of the same received-signal sequence are multiplied by a de-spreading code C2 where the received-signal register and the code register are used in a time-divided fashion to produce correlation values. FIG. 18A shows a situation in which the first symbol S1 of the received signal is input to the received-signal register. This symbol and symbols coming thereafter are shifted, and the third symbol S3 is input as shown in FIG. 18B. Multiplication by the de-spreading code C1 of the symbol S1 stored in the code register is attended to, and the result of multiplication is summed together by the summation circuit to produce a correlation value of the symbol S1 having a length of two symbols.

As shown in FIG. 18C, the second symbol S2 is input to the received-signal register as an initial value, such that the preceding signals corresponding to the computation of a correlation value for the symbol S1 do not affect subsequent correlation computation. Further, a de-spreading code C2 is input to the code register. FIG. 18D shows a situation in which the second symbol S2 of the received signal is input to the received-signal register, and the de-spreading code C2 is input to the code register. From this instance, multiplication of the received signal by the de-spreading code stored in the code register proceeds, with the results of the multiplication being summed together by the summation circuit to produce a correlation value.

Path-search circuits are provided with matched filters as previously described, and need a received-signal register having the number of stages corresponding to the spreading factor m and the over-sample ratio k. Because of such a configuration, circuit size is relatively large. If matched filters are provided as many as there are a plurality of received-signal sequences, circuit size increases in proportion to the number of antennas.

If a received-signal register of a matched filter is to be used on a time-divided basis with respect to a plurality of signals received by respective antennas with an aim of reducing circuit size, the contents of the received signal register need to be all cleared as was described in connection with FIGS. 17A through 17D. Since there is a need to set initial values at every one of such turns, it is not possible to produce a continuous stream of correlation values. If a plurality of received signal sequences are temporarily held in storage, and the received-signal register has a received-signal sequence set therein in a parallel fashion, correlation values may be output as a continuous stream. Such a configuration requires complex circuit structure with regard to the means of holding received signals and the means of making parallel setting to the received-signal register. Even when a time-division scheme is used for different de-spreading codes as shown in FIGS. 18A through 18D, there is a need to make initial settings, thereby making it impossible to output a continuous stream of correlation values.

Accordingly, there is a need for a path-search circuit which can produce a continuous stream of correlation values without need for complex circuit structure when different received signal sequences or different code sequences are supplied.

SUMMARY OF THE INVENTION

It is a general object of the present invention to provide a path-search circuit that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a path-search circuit particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an apparatus including a plurality of received-signal registers which receive and store therein a plurality of respective received-signal sequences, a selector which selects one of the received signal sequences stored in the received-signal registers, at least one code register which stores therein a de-spreading-code sequence, a multiplication circuit which multiplies the selected one of the received-signal sequences by the de-spreading-code sequence, and a summation circuit which obtains a sum of results of the multiplication to obtain a correlation between the selected one of the received-signal sequences and the de-spreading-code sequence.

BRIEF DESCRIPTION OF THE DRAWINGS

FIG. 6 is an illustrative drawing for explaining operation of the path-search circuit according to a third embodiment of the present invention;

FIG. 7 is a block diagram showing a configuration of the path-search circuit according to the third embodiment of the present invention;

FIG. 8 is an illustrative drawing for explaining conversion of time sequences;

FIGS. 9A and 9B are illustrative drawings for explaining operation regarding outputting of correlation values;

DESCRIPTION OF THE PREFERRED EMBODIMENTS

In the following, embodiments of the present invention will be described with reference to the accompanying drawings.

Figure 1:
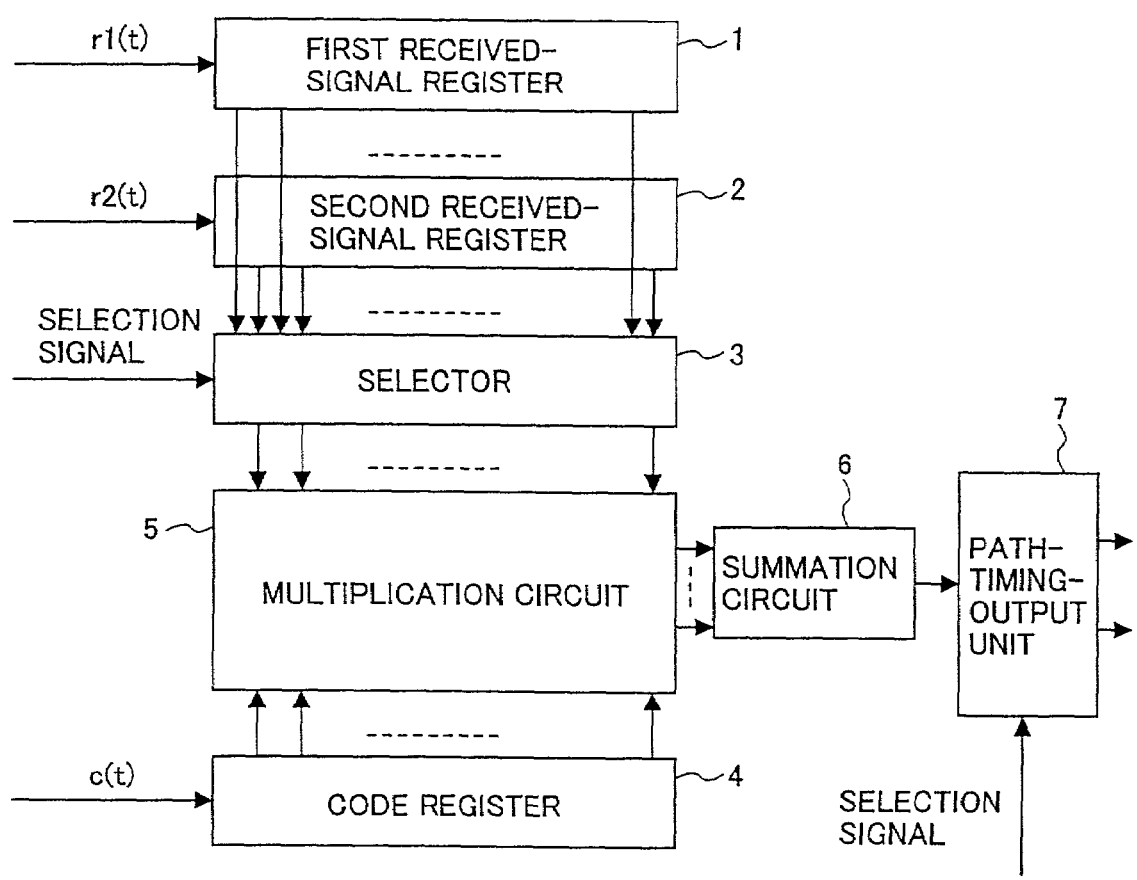
FIG. 1 is a block diagram showing a basic configuration of a path-search circuit according to the present invention.

FIG. 1 is a block diagram showing a basic configuration of a path-search circuit according to the present invention.

In FIG. 1, two signal sequences r1(t) and r2(t) are received. The first received-signal sequence r1(t) is received in a first received-signal register 1, and the second received-signal sequence r2(t) is received in a second received-signal register 2. Further, a de-spreading-code sequence c(t) is stored in a code register 4. A selection signal is supplied to a selector 3 and a path-timing-output unit 7. The path-timing-output unit 7 converts a sequence of correlation values supplied from a summation circuit 6, and converts it into a measure based on electrical power. The path-timing-output unit 7 obtains a delay profile through time average processing, and detects a peak of the delay profile. The obtained peak timing is output as a path timing.

When the selector 3 selects the first received-signal register 1, for example, a multiplication circuit 5 multiplies one symbol of the first received-signal sequence r1(t) by the de-spreading-code sequence c(t) stored in the code register 4. The summation circuit 6 obtains a sum of the results of multiplication, and supplies the correlation value to the path-timing-output unit 7. The path-timing-output unit 7 outputs a path-timing signal corresponding to the first received-signal sequence r1(t).

As the second received-signal sequence r2(t) is supplied during the processing of the first received-signal sequence r1(t), the second received-signal sequence r2(t) is stored in the second received-signal register 2. When computation for one symbol of the first received-signal sequence r1(t) is completed, the selector 3 operating under the control of the selection signal selects the second received-signal register 2. In response, one symbol of the second received-signal sequence r2(t) is input to the multiplication circuit 5. The multiplication circuit 5 multiplies this symbol by the de-spreading-code sequence c(t), and the summation circuit 6 adds together the results of multiplication to obtain a correlation value. The obtained correlation values is supplied to the path-timing-output unit 7, which in turn outputs a path timing signal of the second received-signal sequence r2(t).

In this manner, the selector 3 switches between the first received-signal register 1 and the second received-signal register 2 per computation of one symbol, so that shared use of the multiplication circuit 5, the code register 4, the summation circuit 6, and the path-timing-output unit 7 becomes possible with respect to the first and second received-signal sequences r1(t) and r2(t). This makes it possible to produce a continuous stream of correlation values without increasing circuit size.

Figure 2:
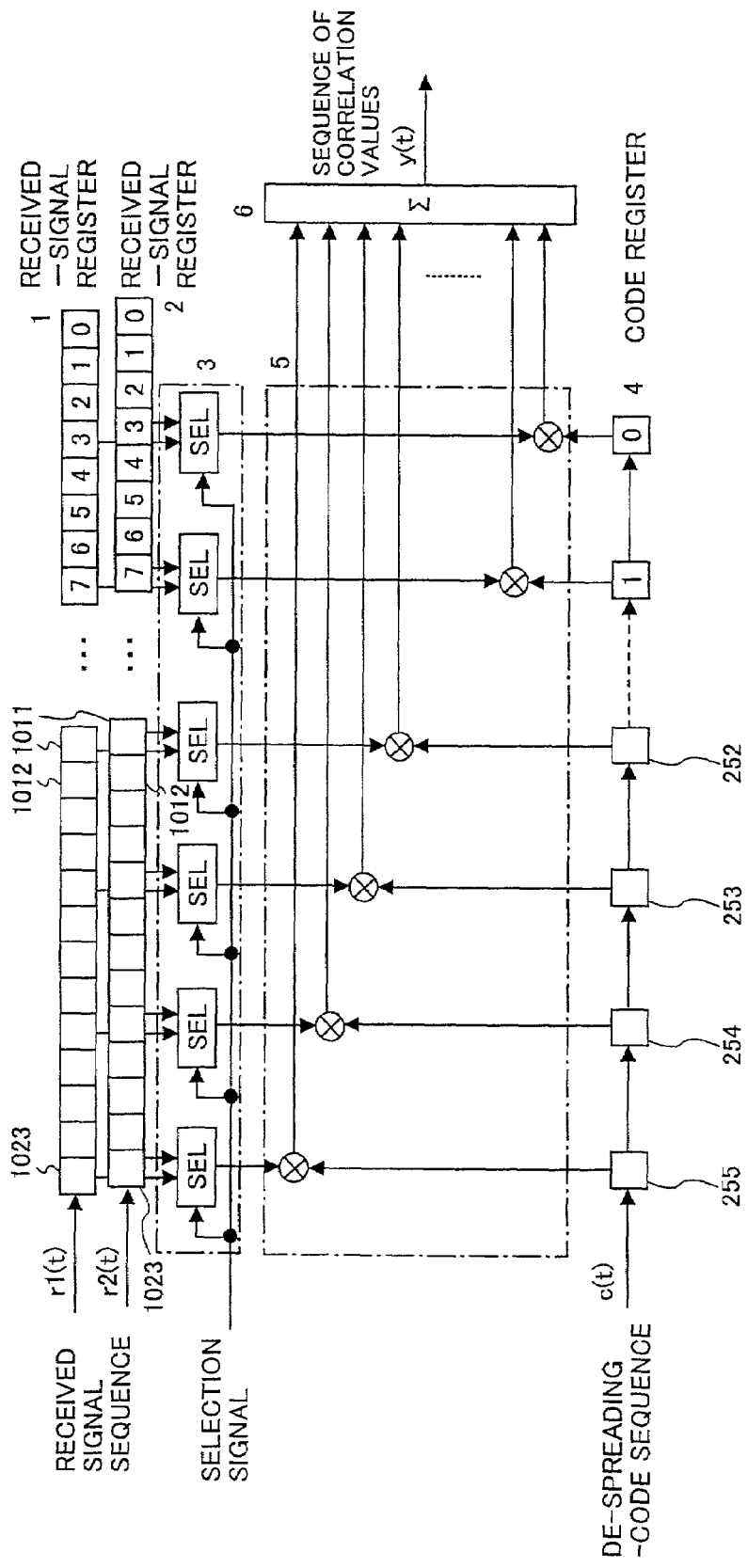
FIG. 2 is an illustrative drawing for explaining operation of the path-search circuit according to a first embodiment of the present invention.

FIG. 2 is an illustrative drawing for explaining operation of the path-search circuit according to a first embodiment of the present invention. FIG. 2 shows a main portion of a matched filter of the path-search circuit. In FIG. 2, the same elements as those of FIG. 1 are referred to by the same numerals, and a description thereof will be omitted.

An example shown in FIG. 2 corresponds to a case in which the spreading factor m is 256, and the over-sample ratio k relative to the chip rate is 4. Each of the first received-signal register 1 and the second received-signal register 2 is a shift register having 1024 stages (=m×k). The code register 4 is a shift register having 256 stages (=m). Further, the selector 3 includes selector units SEL provided as many as 256 units. According to the selection signal, the selector units select every fourth stage of the first received-signal register 1 or the second received-signal register 2 such as the $3^{rd}$ stage, the $7^{th}$ stage, the $11^{th}$ stage, ..., and the $1023^{rd}$ stage, and supplies output signals of these stages to the multiplication circuit 5.

The multiplication circuit 5 includes 256 multiplication units shown and indicated by a symbol "×" where the multiplication units multiply the received signal supplied from the selector units SEL by the de-spreading code supplied from the code register 4. The summation circuit 6 obtains a sum of the outputs of the 256 multiplication units to produce a correlation value. A correlation value is obtained each time the received-signal register performs a shift operation, and a sequence of correlation values y(t) obtained in this manner is supplied to circuits provided at subsequent stages.

During a process in which one symbol of the first received-signal sequence r1(t) is shifted into the first received-signal register 1 to produce a correlation value sequence y(t) corresponding to the one symbol, the second received-signal sequence r2(t) is successively shifted into the second received-signal register 2. When computation of the correlation value sequence y(t) is completed for the one symbol of the first received-signal sequence r1(t), the selector 3 operating under the control of the selection signal selects the second received-signal register 2, so that the output signal of each stage of the second received-signal register 2 is supplied to the multiplication circuit 5. The signals from the second received-signal register 2 are multiplied by the de-spreading-code sequence c(t) of the code register 4, with the results of the multiplication being summed by the summation circuit 6. The summation circuit 6 produces a correlation value sequence y(t) corresponding to the one symbol of the second received-signal sequence r2(t).

When computation of the correlation value sequence y(t) is completed for the one symbol of the second received-signal sequence r2(t), the first received-signal register 1 has a next one symbol of the first received-signal sequence r1(t) shifted and stored therein. The selection signal controls the selector 3 to switch from the second received-signal register 2 to the first received-signal register 1, and the computation of correlation values is repeated again. In this manner, correlation values are computed in a time-divided fashion with respect to the two received-signal sequences without a need for making initial settings to the received-signal registers. This makes it possible to produce a continuous flow of correlation value sequence for the first received-signal sequence r1(t) and the second received-signal sequence r2(t).

Figure 3A:
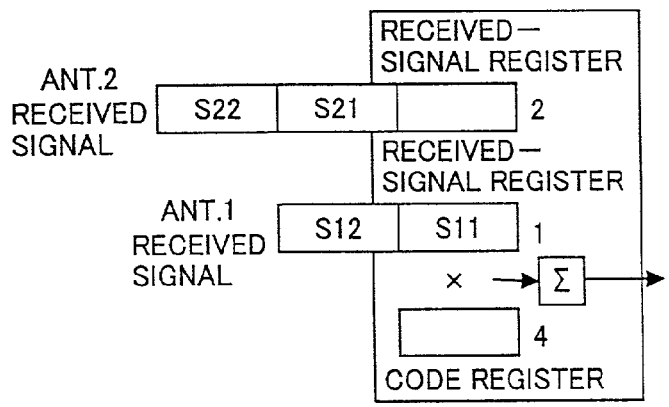
FIGS. 3A through 3C are illustrative drawings for explaining operation of the first embodiment.
Figure 3B:
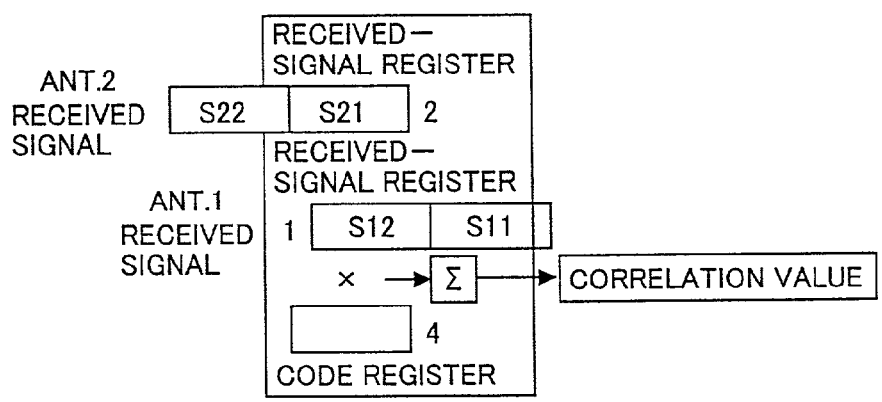
Figure 3C:
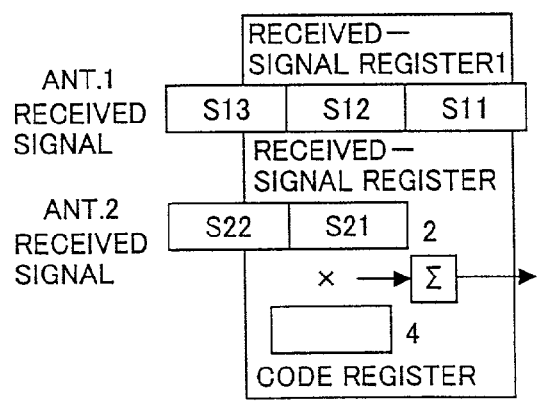

FIGS. 3A through 3C are illustrative drawings for explaining operation of the first embodiment. FIG. 3A shows a situation in which the first symbol S11 of a signal received by a first antenna (i.e., first received-signal sequence) is input to the first received-signal register 1, and the first symbol S21 of a signal received by a second antenna (i.e., second received-signal sequence) is not yet input to the second received-signal register 2. The first symbol S11 of the first-antenna-received signal stored in the first received-signal register 1 is multiplied by the de-spreading code of the code register 4, and the results of multiplication are summed by the summation circuit.

FIG. 3B shows a situation in which the first symbol S21 of the second-antenna-received signal is input to the second received-signal register 2, and the second symbol S12 of the first-antenna-received signal is input to the first received-signal register 1. At this point of time, a correlation value corresponding to one symbol length obtained under the conditions of FIG. 3A is being output.

As shown in FIG. 3C, the selector switches from the first received-signal register 1 to the second received-signal register 2, so that the first symbol S21 of the second-antenna-received signal stored in the second received-signal register 2 is multiplied by the de-spreading code of the code register 4. The summation circuit then obtains a sum of the results of multiplication to produce a correlation value. In this manner, the first received-signal register 1 and the second received-signal register 2 are switched back and forth by the selector, thereby outputting a continuous stream of correlation values.

Figure 4:
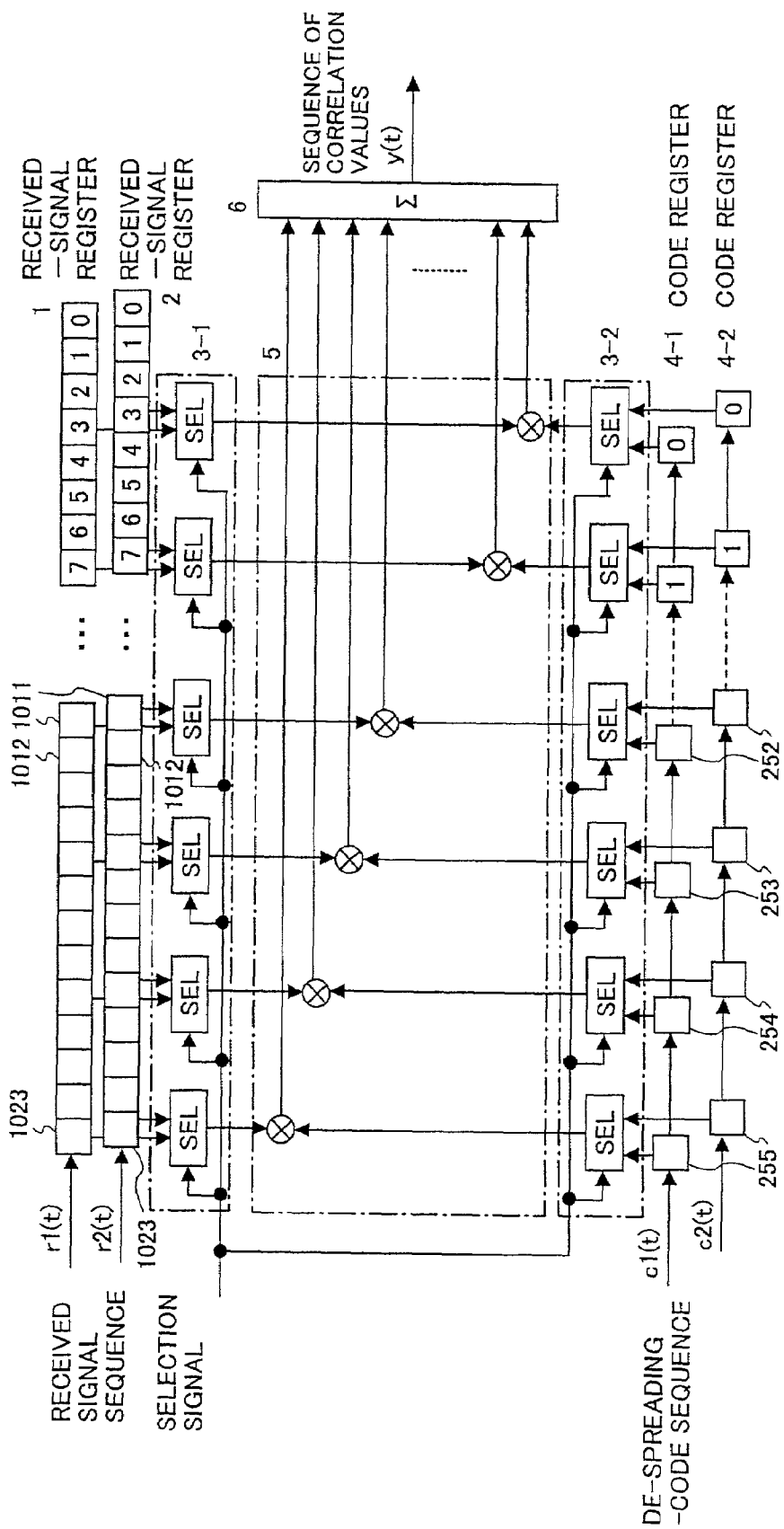
FIG. 4 is an illustrative drawing for explaining operation of the path-search circuit according to a second embodiment of the present invention.

FIG. 4 is an illustrative drawing for explaining operation of the path-search circuit according to a second embodiment of the present invention. A configuration of FIG. 4 includes the first received-signal register 1, the second received-signal register 2, a first code register 4-1, a second code register 4-2, a first selector 3-1, a second selector 3-2, the multiplication circuit 5, and the summation circuit 6. The first received-signal register 1, the second received-signal register 2, the multiplication circuit 5, and the summation circuit 6 are the same as those shown in FIG. 2. The second selector 3-2 is provided for the purpose of selecting one of the first code register 4-1 and the second code register 4-2.

The first received-signal register 1 and the second received-signal register 2 receive the first received-signal sequence r1(t) and the second received-signal sequence r2(t), respectively. Further, the first and second code registers 4-1 and 4-2 receive first and second de-spreading-code sequences c1(t) and c2(t) corresponding to the first and second received-signal sequences r1(t) and r2(t), respectively.

The selection signal controls the first and second selectors 3-1 and 3-2 to select the first received-signal register 1 and the first code register 4-1, so that the multiplication circuit 5 receives the first received-signal sequence r1(t) and the first de-spreading-code sequence c1(t) to multiply one by the other. The summation circuit 6 adds together the results of multiplication to output a correlation-value sequence y(t). Thereafter, the selection signal controls the first and second selectors 3-1 and 3-2 to select the second received-signal register 2 and the second code register 4-2, so that the multiplication circuit 5 receives the second received-signal sequence r2(t) and the second de-spreading-code sequence c2(t) to multiply one by the other. The summation circuit 6 adds together the results of multiplication to output the correlation-value sequence y(t).

Figure 5A:
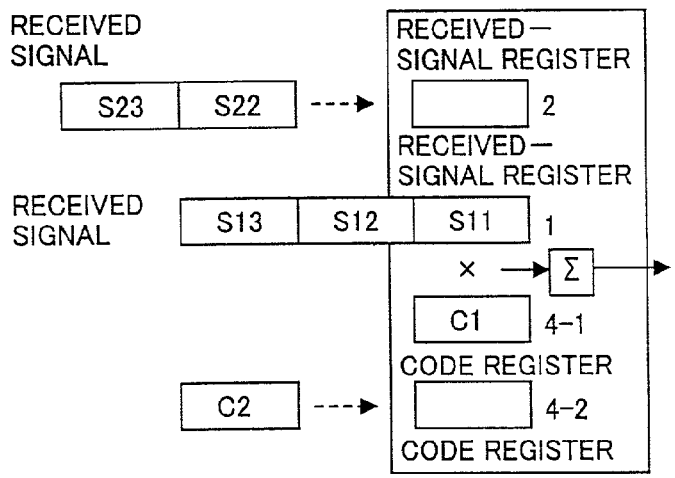
FIGS. 5A through 5C are illustrative drawings for explaining operation of the second embodiment with reference to a case in which a correlation value corresponding to a two-symbol length is output.
Figure 5B:
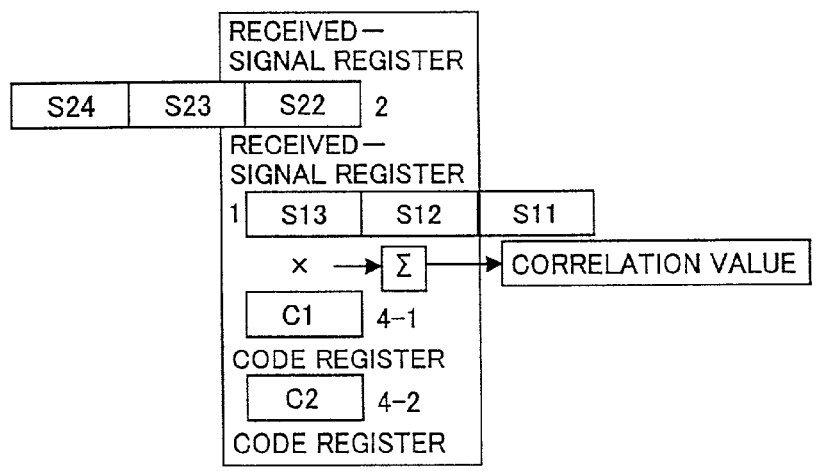
Figure 5C:
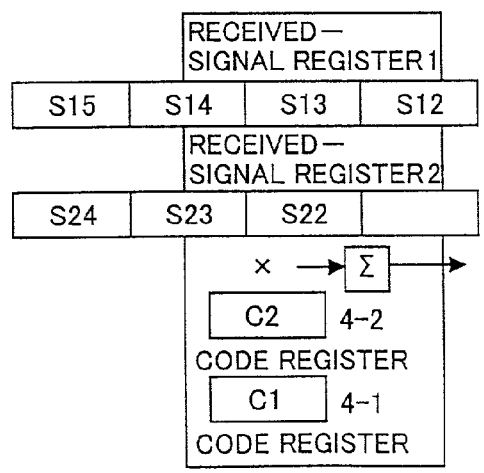

FIGS. 5A through 5C are illustrative drawings for explaining operation of the second embodiment with reference to a case in which a correlation value corresponding to a two-symbol length is output. In these figures, the symbols S11, S12, . . . are those of a first received signal, and the symbols S21, S22, S23, . . . are those of a second received signal. Further, C1 and C2 represent the first and second de-spreading codes, respectively. In FIGS. 5A through 5C, the first and second received-signal registers 1 and 2, the first and second code registers 4-1 and 4-2, and the summation circuit 6 (indicated by "sigma") are shown.

FIG. 5A shows a situation in which the first symbol S11 of the first received-signal input to the first received-signal register 1 is multiplied by the first de-spreading code C1 input to the first code register 4-1, and the results of multiplication are summed by the summation circuit to produce a correlation value. This situation is followed by a situation in which the second received signal is input to the second received-signal register 2, and the second de-spreading code C2 is input to the second code register 4-2, as shown by the dotted lines.

FIG. 5B shows a situation in which the first and second symbols S11 and S12 of the first received signal are successively shifted, and the third symbol S13 is input to the first received-signal register 1. In this situation, further, the second symbol S22 of the second received signal is input to the second received-signal register 2, and the second de-spreading code C2 is input to the second code register 4-2. At this point of time, a correlation value corresponding to a two-symbol length is being output with respect to the first and second symbols S11 and S12 of the first received signal.

Then, the first received-signal register 1 and the second received-signal register 2 are switched, and the first code register 4-1 and the second code register 4-2 are switched, as shown in FIG. 5C. The second received signal is multiplied by the second de-spreading code C2, and a sum of the results of multiplication is computed to produce a correlation value. As was in the previous situation, a correlation value being output in this case corresponds to a two-symbol length. The correlation value is output with respect to the second and third symbols S22 and S23 of the second received signal.

FIG. 6 is an illustrative drawing for explaining operation of the path-search circuit according to a third embodiment of the present invention. A configuration of FIG. 6 includes first and second received-signal registers 11 and 12, first and second selectors 13 and 14, a multiplication circuit 15, a summation circuit 16, and first and second code registers 17 and 18.

In this embodiment, the spreading factor m is 256, and the over-sample ratio k relative to the chip rate is 4. As was in the previous embodiments, each of the first and second code resisters 17 and 18 is a shift register having 256 stages (=m). Further, each of the first received-signal register 11 and the second received-signal register 12 is a shift register having 256 stages.

The first received-signal sequence r1(t) and the second received-signal sequence r2(t) have the order thereof rearranged at preceding stages (not shown). For example, each of the first received-signal register 1 and the second received-signal register 2 receives the $0^{th}$ item, the $4^{th}$ item, the $8^{th}$ item, . . . , and the $1020^{th}$ item of 1023 items of the received signal, which are then subjected to multiplication by the de-spreading code. Thereafter, the $1^{st}$ item, the $5^{th}$ item, the $9^{th}$ item, . . . , and the $1021^{st}$ item are input, followed by inputting of the $2^{nd}$ item, the $6^{th}$ item, the $10^{th}$ item, . . . , and the $1022^{nd}$ item. Finally, the $3^{rd}$ item, the $7^{th}$ item, the $11^{th}$ item, . . . , and the $1023^{rd}$ item are input. In this manner, if a received signal sequence is converted into four signal sequences in the case of k=4, a received-signal register having 256 stages can be used to compute a correlation value with respect to each of the four signal sequences. That is, the four signal sequences may be time multiplexed to produce first and second received-signal sequences, which are then supplied to the first and second received-signal registers 11 and 12, respectively. In this manner, use of the first and second received-signal registers 11 and 12 each having 256 stages allows correlation values to be computed as a continuous stream in a manner similar to when the 1024-stage configuration is used.

The first and second selectors 13 and 14, the first and second code registers 17 and 18 for receiving the respective de-spreading-code sequences c1(t) and c2(t), the multiplication circuit 15, and the summation circuit 16 operate in the same manner as in the previous embodiments. The selector signal controls the first and second selectors 13 and 14 to produce a correlation-value sequence y(t) corresponding to the first and second received-signal sequences r1(t) and r2(t). In this case, the correlation-value sequence y(t) does not reflect a correct order of time sequence, so that circuits at subsequent stages may change the order. In this configuration, size of the first and second received-signal registers 11 and 12 can be reduced significantly, thereby contributing to size and cost reduction of the path-search circuit.

FIG. 7 is a block diagram showing a configuration of the path-search circuit according to the third embodiment of the present invention.

The path-search circuit of FIG. 7 includes a received-signal-holding unit 31 for in-phase components, a received-signal-holding unit 32 for quadrature components, a time-sequence-order-write-control circuit 33, a chip-sequence-order-read-control circuit 34, a code-generation circuit 35, matched filters 36 and 37, an in-phase-component circuit 38, a quadrature-component circuit 39, a power-conversion circuit 40, a power-summation circuit 41, a chip-sequence-order-write-control circuit 42, a time-sequence-order-read-control circuit 43, a delay-profile-holding unit 44, and a path-timing-detection circuit 45.

The path-search circuit of this embodiment receives in-phase components and quadrature components obtained by quadrature demodulation, and has the matched filters 36 and 37 in which received-signal registers are provided with 256 (=m:spreading factor) stages as shown in FIG. 6. The demodulated signals of in-phase components and quadrature components obtained after conversion into digital signals are supplied to the received-signal-holding units 31 and 32. Under the control of the time-sequence-order-write-control circuit 33, the demodulated signals are successively written in the received-signal-holding units 31 and 32 in accordance with the received time sequence. Under the control of the chip-sequence-order-read-control circuit 34, the demodulated signals are successively read out by selecting every third item from the time sequence arrangement. In this manner, conversion into four received-signal sequences (k=4) is achieved.

Because of the conversion, the matched filters 36 and 37 can compute and output correlation values despite the fact that the matched filters 36 and 37 have the received-signal registers of only 256 stages, and have code registers of only 256 stages for inputting de-spreading codes. Since the output correlation values are not arranged in a time-sequence order, they are written in the delay-profile-holding unit 44 via the power-conversion circuit 40 and the power-summation circuit 41 in a chip-sequence order under the control of the chip-sequence-order-write-control circuit 42. At the time of reading, the time-sequence-order-read-control circuit 43 controls the read operation in such manner as to read data in a time-sequence order. As a result, the delay-profile-holding unit 44 holds a delay profile in the time-sequence order. The path-timing-detection circuit 45 detects a peak of the delay profile, and outputs the detected peak as an indication of the path timing.

FIG. 8 is an illustrative drawing for explaining conversion of time sequence. When the spreading factor m is 256, and the over-sample ratio k relative to the chip rate is 4, one symbol will be comprised of 1024 samples. As shown in the upper half of FIG. 8, samples for the first chip are $0a$, $0b$, $0c$, and $0d$, and samples for the second chip are $1$, $1b$, $1c$, and $1d$. By the same token, samples for the $256^{th}$ chip are $255a$, $255b$, $255c$, and $255d$. In this case, such a time sequence can be rearranged into four sequences, which are shown as a sequence, b sequence, c sequence, and d sequence in the lower half of FIG. 8. For each of these four sequences, the over sample ratio k is 1.

Under the control of the time-sequence-order-write-control circuit 33, the received signal as shown in the upper half of FIG. 8 is written in the received-signal-holding units 31 and 32 shown in FIG. 7 in the order of time sequence. Then, the samples $0a$, $1a$, $2a$, ..., $255a$ of the a sequence as shown in the lower half of FIG. 8 are successively read from the received-signal-holding units 31 and 32 under the control of the chip-sequence-order-read-control circuit 34. After this, the samples $0b$, $1b$, $2b$, ..., $255b$ of the b sequence are successively read, and, then, the samples of the c sequence are read, followed by the samples of the d sequence being read. In this manner, each sequence has 256 samples, so that the matched filters 36 and 37 provided with the 256-stage received-signal registers can obtain correlation values as was described in connection with FIG. 6.

FIGS. 9A and 9B are illustrative drawings for explaining operation regarding outputting of correlation values.

In FIG. 9A, the first and second received-signal registers 11 and 12 having 256 stages are provided together with the 256-stage code register, as shown in FIG. 6. The first received-signal register 11 receives the a sequence and the c sequence, and the second received-signal register 12 receives the b sequence and the d sequence.

The a sequence 1 is input to the first received-signal register 11, and is multiplied by the de-spreading code of the code register, with the summation circuit obtaining the sum to be output. During this computation process, the b sequence 1 is input to the second received-signal register 12. Then, the b sequence 1 is multiplied by the de-spreading code, and the sum is obtained by the summation circuit to be output. As shown in FIG. 9B, the resulting sequence of correlation value outputs is comprised of the correlation values 0A through 255A corresponding to the a sequence, the correlation values 0B through 255B corresponding to the b sequence, the correlation values 0C through 255C for the c sequence, and the correlation values 0D through 255D for the d sequence, the entirety of which constitutes a sequence of 1024 correlation values.

The sequence of 1024 correlation values shown in FIG. 9B is not arranged in the order of time sequence, giving rise to a need for conversion into a time sequence.

Figure 10:
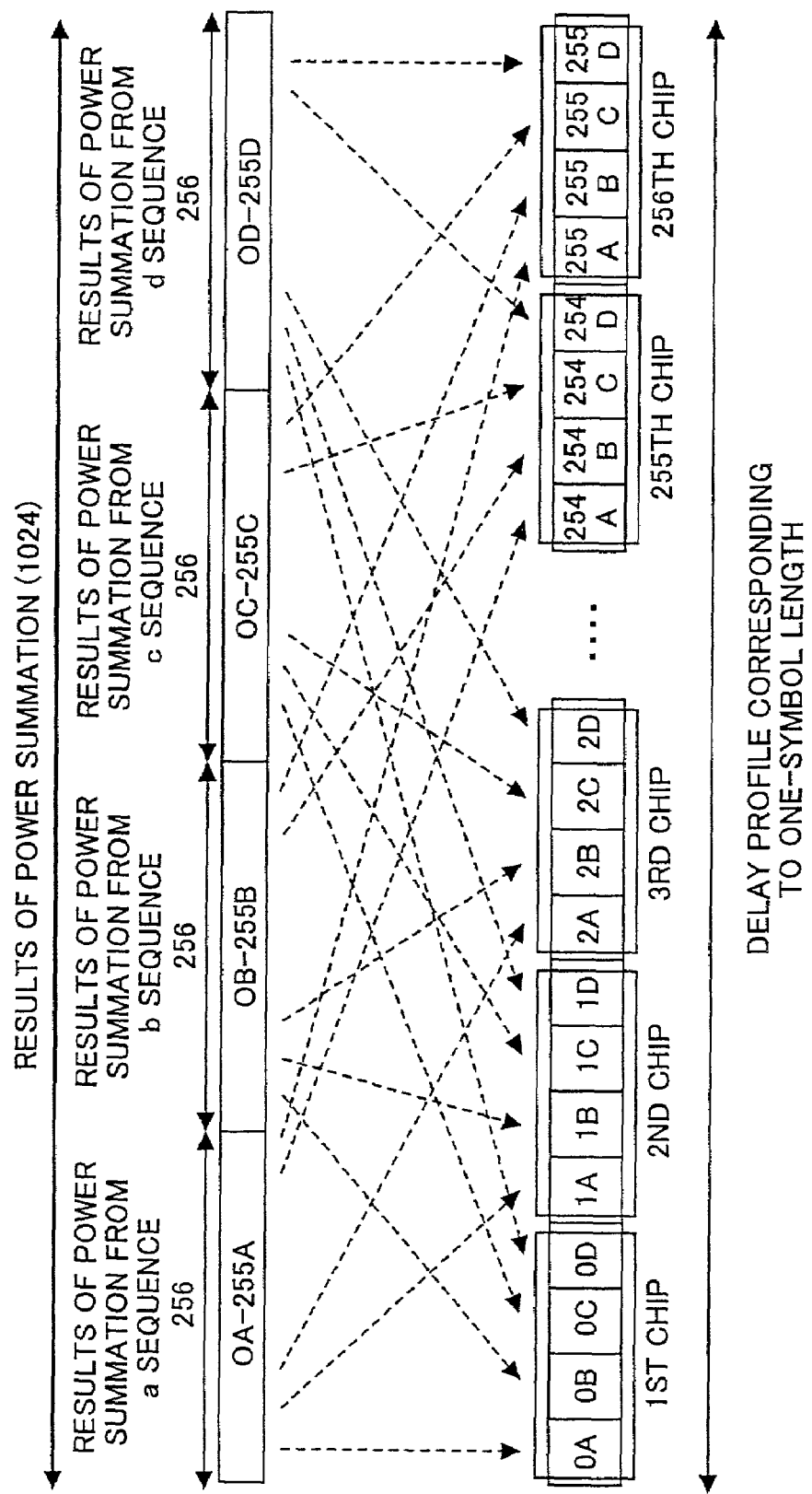
FIG. 10 is an illustrative drawing for explaining conversion of order into a time sequence.

FIG. 10 is an illustrative drawing for explaining conversion of order into a time sequence.

The chip-sequence-order-write-control circuit 42 of FIG. 7 controls the order of data written in the delay-profile-holding unit 44 when the results of power summation corresponding to the a sequence through the d sequence are supplied from the power-summation circuit 41.

Under the control of the time-sequence-order-read-control circuit 43, data are read in the order of time sequence, so that data for the first chip of the delay profile are made up of the sample 0A taken from the results of power summation 0A through 255A for the a sequence, the sample 0B taken from the results of power summation 0B through 255B for the b sequence, the sample 0C taken from the results of power summation 0C through 255C for the c sequence, and the sample 0D taken from the results of power summation 0D through 255D for the d sequence. Data for the second chip are comprised of 1A, 1B, 1C, and 1D successively read from the delay-profile-holding unit 44. In this manner, the delay profile is obtained that is comprised of the results of power summation arranged in the time-sequence order from the first chip to the $256^{th}$ chip. As a result, the path-timing-detection circuit 45 of FIG. 7 can simply detect a peak of the delay profile read from the delay-profile-holding unit 44 in the time-sequence order, and outputs the peak timing as a path timing. This is all that is required of the path-timing-detection circuit 45 as was in the prior art.

Figure 11:
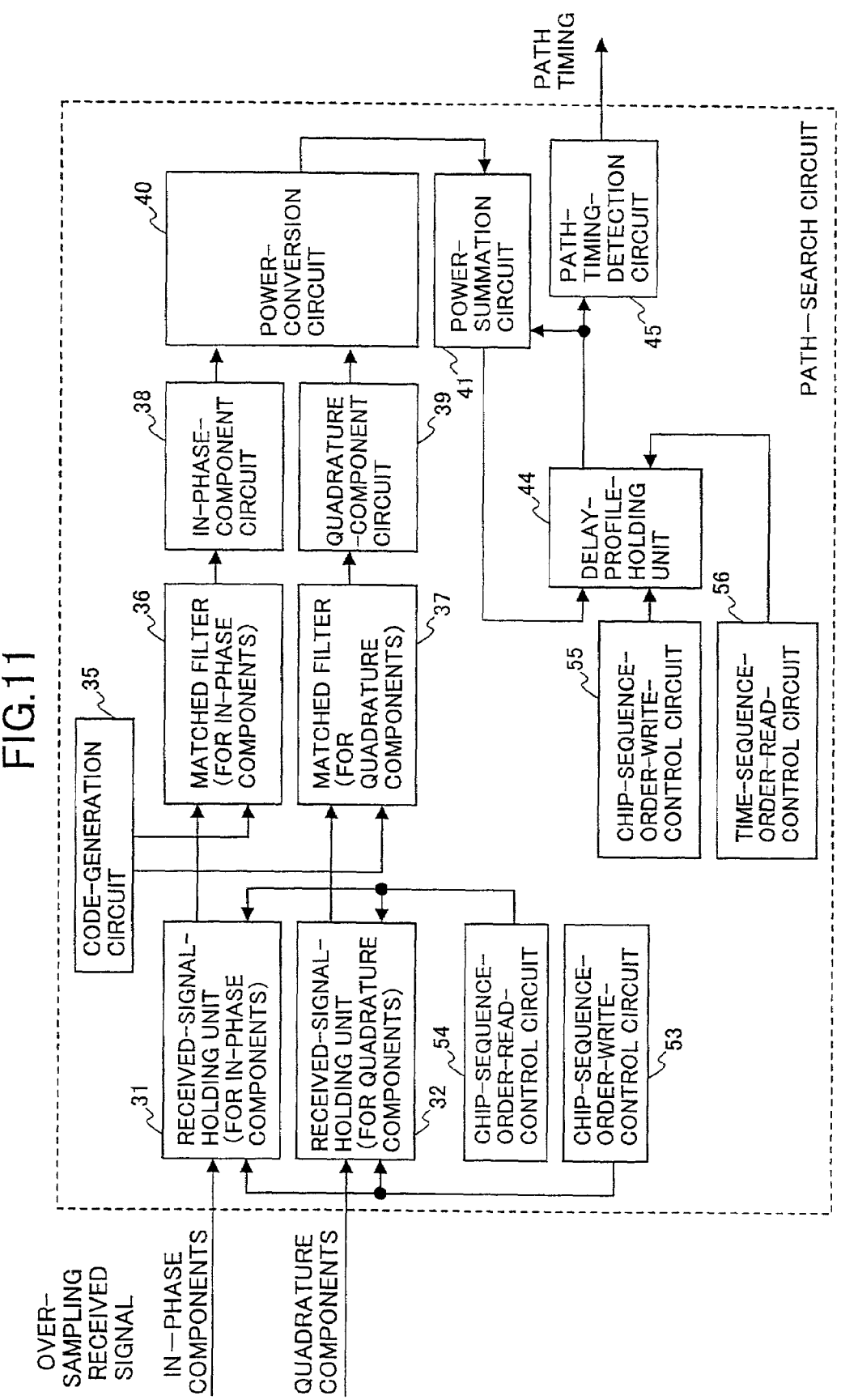
FIG. 11 is a block diagram showing a configuration of the path-search circuit according to a fourth embodiment of the present invention.

FIG. 11 is a block diagram showing a configuration of the path-search circuit according to a fourth embodiment of the present invention. In FIG. 11, the same elements as those of FIG. 7 are referred to by the same numerals.

The path-search circuit of FIG. 11 includes a chip-sequence-order-write-control circuit 53, a chip-sequence-order-read-control circuit 54, a chip-sequence-order-write-control circuit 55, and a time-sequence-order-read-control circuit 56. In this case, the chip-sequence-order-write-control circuit 53 controls the order of samples written in the received-signal-holding units 31 and 32 when demodulated signals of in-phase components and quadrature components are supplied as digital signals, such that they are written in the order of addresses, i.e., in the chip-sequence order as shown in the lower half of FIG. 8. Under the control of the chip-sequence-order-read-control circuit 54, each one of the k sequences is successively read, and is supplied to the matched filters 36 and 37.

In this case, the results of power summation are output from the power-summation circuit 41 in the order of chip sequence. The chip-sequence-order-write-control circuit 55 controls the order of data written in the delay-profile-holding unit 44 such that they are written in the chip-sequence order. Under the control of the timesequence-order-read-control circuit 56, data are read in the order of time sequence as shown in FIG. 10, and are supplied to the path-timing-detection circuit 45 as a delay profile arranged in the time-sequence order.

Figure 12:
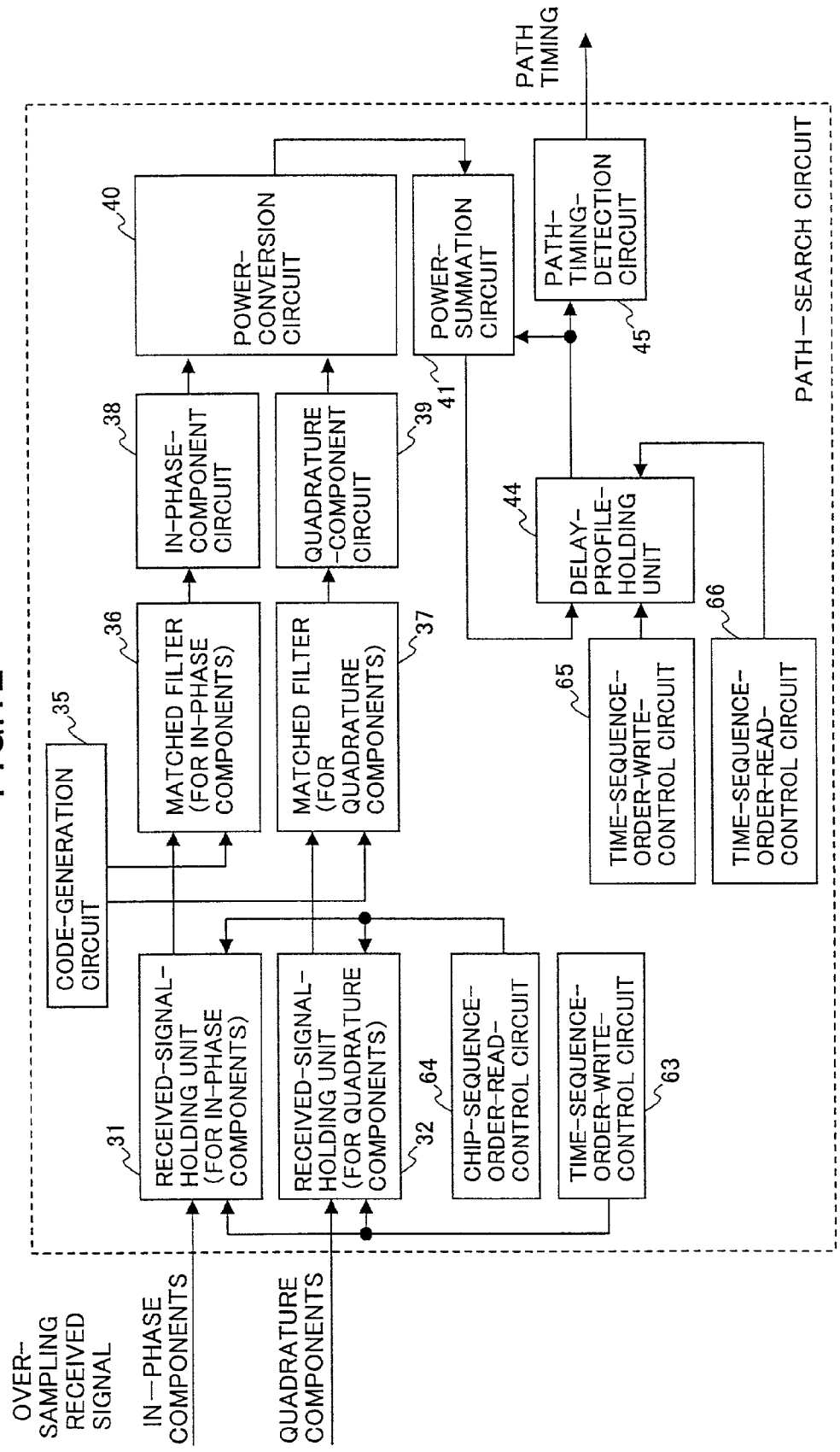
FIG. 12 is a block diagram showing a configuration of the path-search circuit according to a fifth embodiment of the present invention.

FIG. 12 is a block diagram showing a configuration of the path-search circuit according to a fifth embodiment of the present invention. In FIG. 12, the same elements as those of FIG. 7 and FIG. 11 are referred to by the same numerals.

The path-search circuit of FIG. 12 includes a time-sequence-order-write-control circuit 63, a chip-sequence-order-read-control circuit 64, a time-sequence-order-write-control circuit 65, and a time-sequence-order-read-control circuit 66. In this case, the time-sequence-order-write-control circuit 63 controls the order of samples written in the received-signal-holding units 31 and 32 when demodulated signals of in-phase components and quadrature components are supplied as digital signals, such that they are written in the order of time sequence as shown in the upper half of FIG. 8. Under the control of the chip-sequence-order-read-control circuit 64, each one of the k sequences is successively read, and is supplied to the matched filters 36 and 37. In this case, control that dictating operation of the received-signal-holding units 31 and 32 is the same as in the case of FIG. 7.

The results of power summation are output from the power-summation circuit 41 in the order of chip sequence. The time-sequence-order-write-control circuit 65 controls the order of data written in the delay-profile-holding unit 44 such that they are written in the time-sequence order. Under the control of the time-sequence-order-read-control circuit 66, data are read in the order of time sequence as shown in FIG. 10, and are supplied to the path-timing-detection circuit 45 as a delay profile arranged in the time-sequence order.

Figure 13:
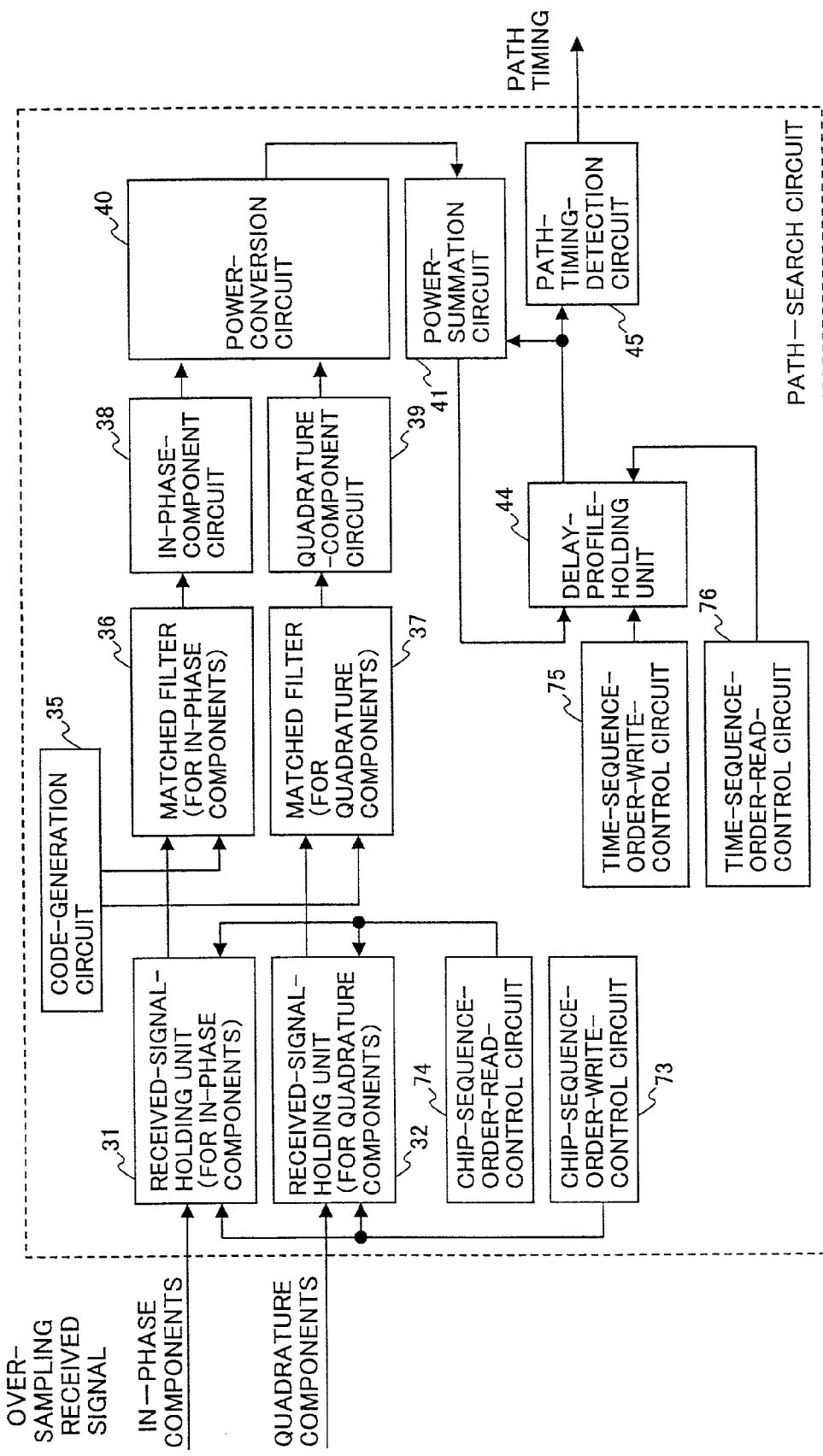
FIG. 13 is a block diagram showing a configuration of the path-search circuit according to a sixth embodiment of the present invention.

FIG. 13 is a block diagram showing a configuration of the path-search circuit according to a sixth embodiment of the present invention. In FIG. 13, the same elements as those of FIG. 7, FIG. 11, and FIG. 12 are referred to by the same numerals.

The path-search circuit of FIG. 13 includes a chip-sequence-order-write-control circuit 73, a chip-sequence-order-read-control circuit 74, a time-sequence-order-write-control circuit 75, and a time-sequence-order-read-control circuit 76. In this case, control of write operation and read operation with respect to the received-signal-holding units 31 and 32 is the same as in the case of FIG. 11, and control of write/read operation of the delay-profile-holding unit 44 is the same as in the case of FIG. 12. Accordingly, the received time sequence is converted into a chip sequence, and the results of power summation supplied in the order of chip sequence is converted into a time sequence, such that both conversions are carried out in the same manner as in the previous embodiments. A duplicate description of these conversion operations will be omitted.

Figure 14:
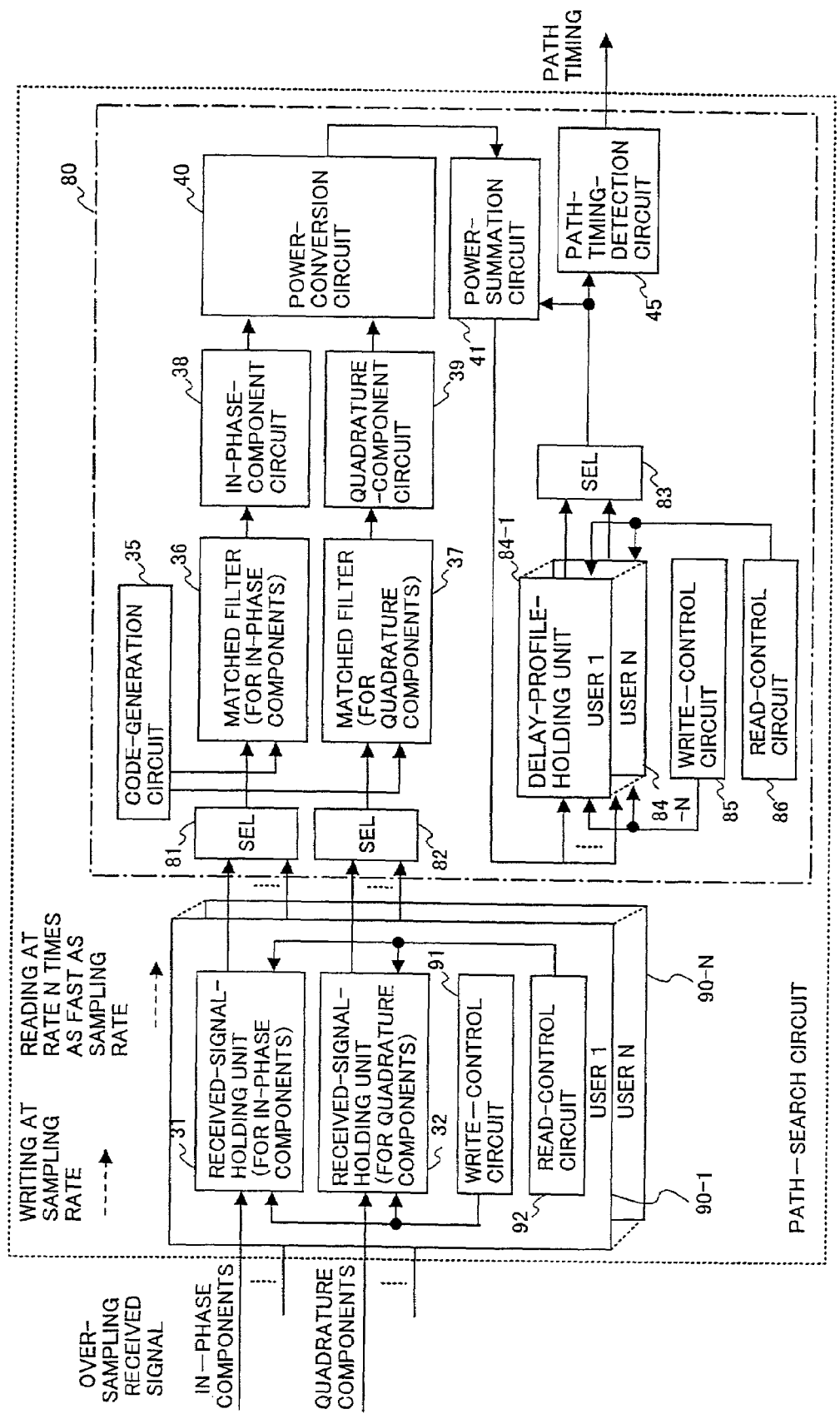
FIG. 14 is a block diagram showing a configuration of the path-search circuit according to a seventh embodiment of the present invention.
Figure 15:
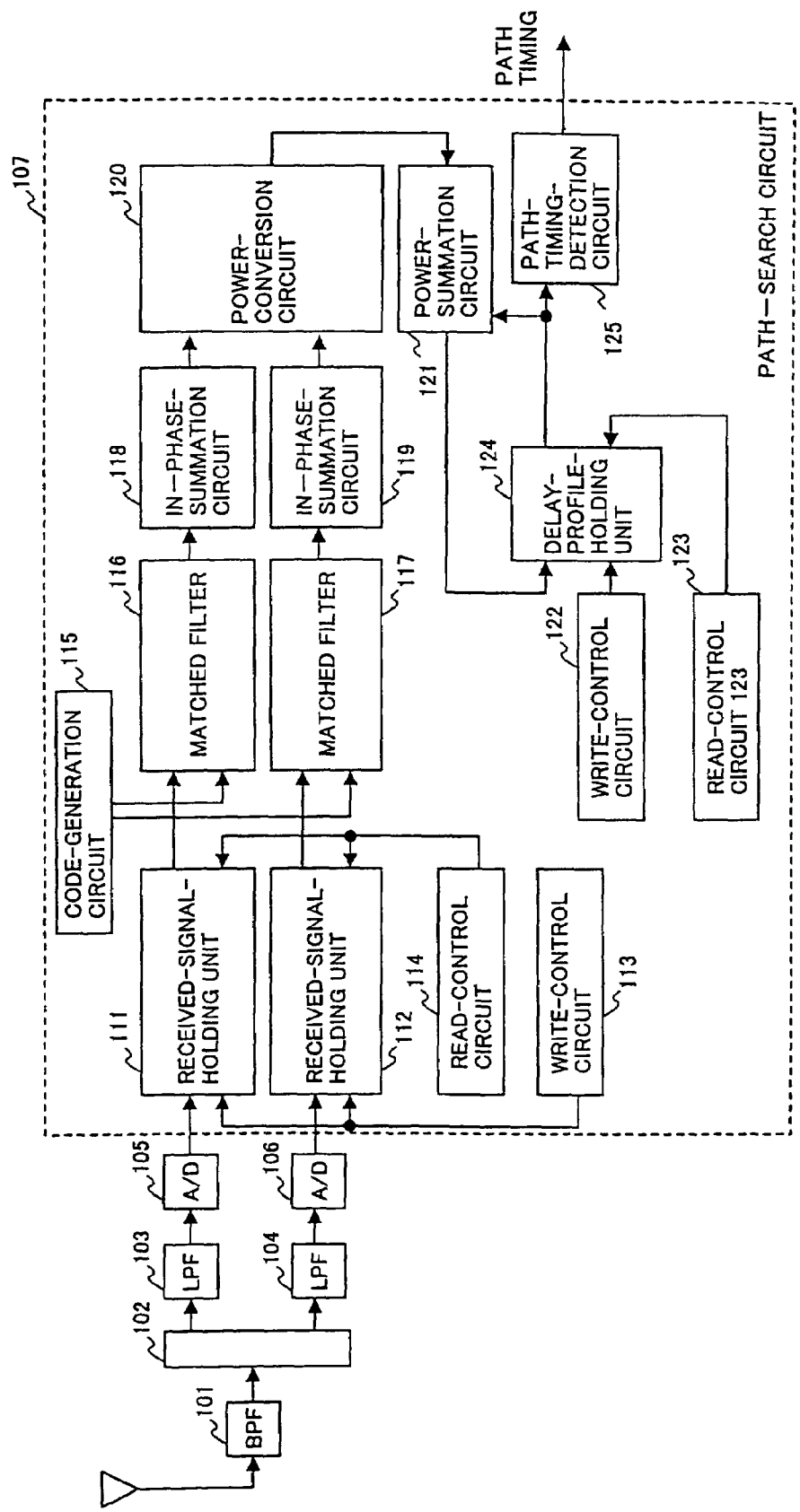
FIG. 15 is a block diagram showing a related-art path-search circuit.
Figure 16:
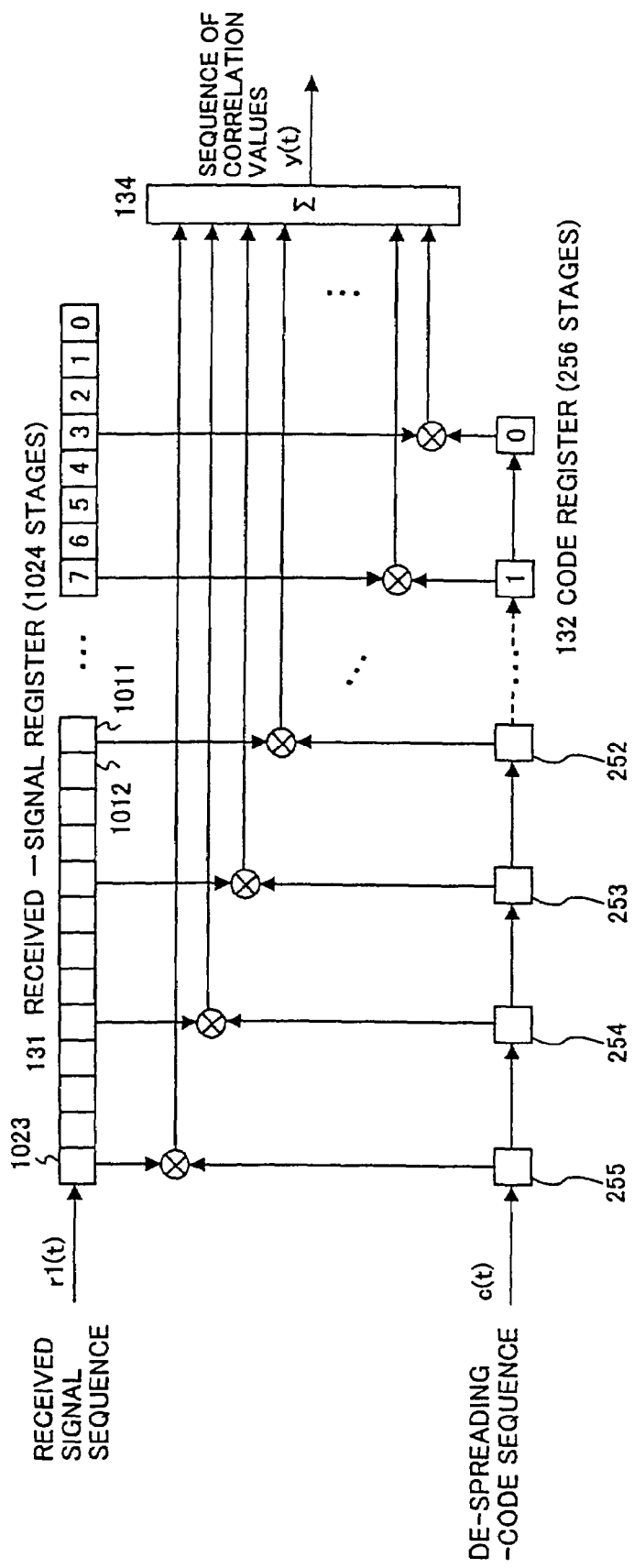
FIG. 16 is an illustrative drawing for explaining operation of a related-art matched filter.
Figure 17C:
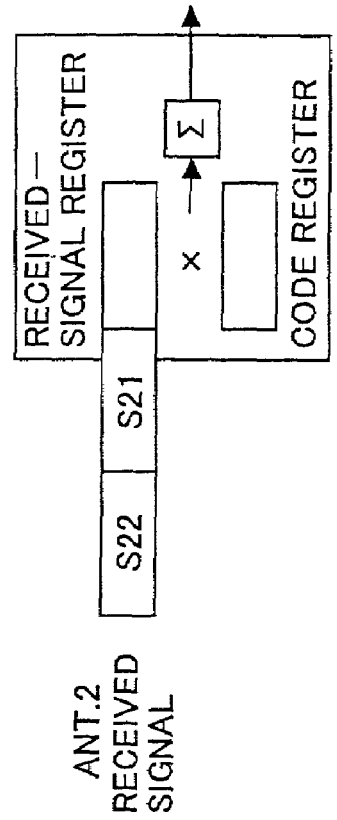
FIGS. 17A through 17D are illustrative drawing for explaining detection of correlation values in received signals that are diffused by use of identical codes.
Figure 17D:
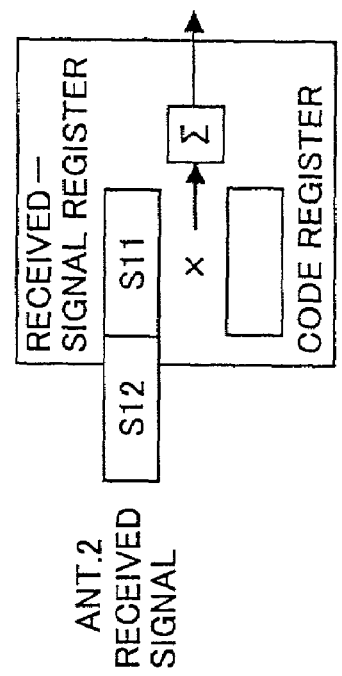
Figure 17A:
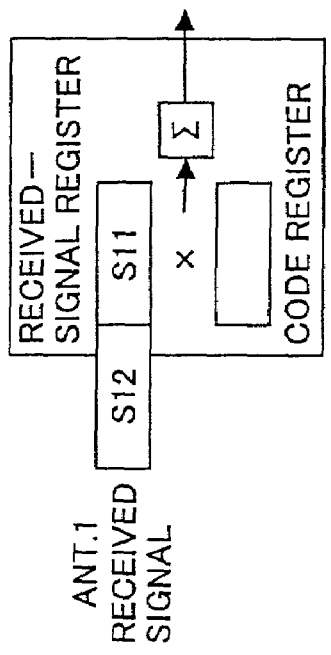
Figure 17B:
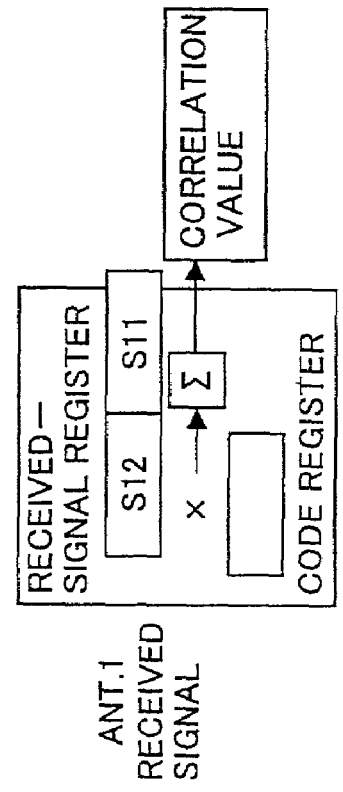
Figure 18A:
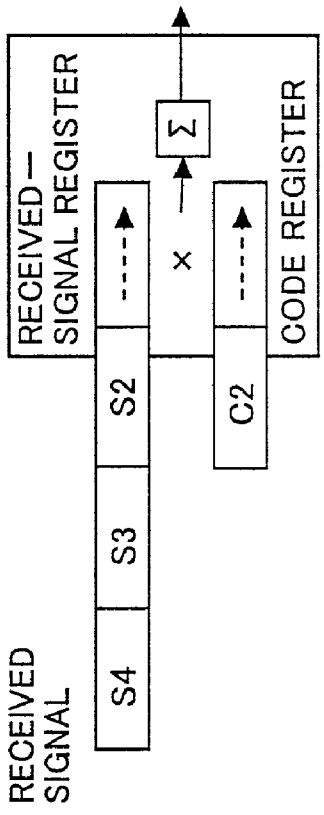
FIGS. 18A through 18D are illustrative drawings for explaining detection of correlation values having a length of two symbols for sequences of different codes.
Figure 18B:
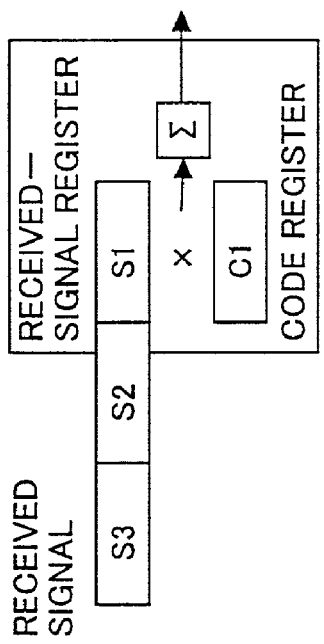
Figure 18C:
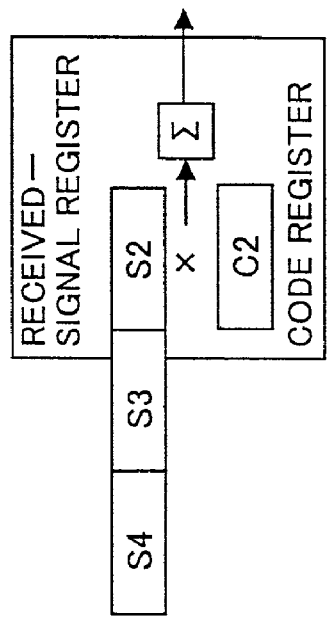
Figure 18D:
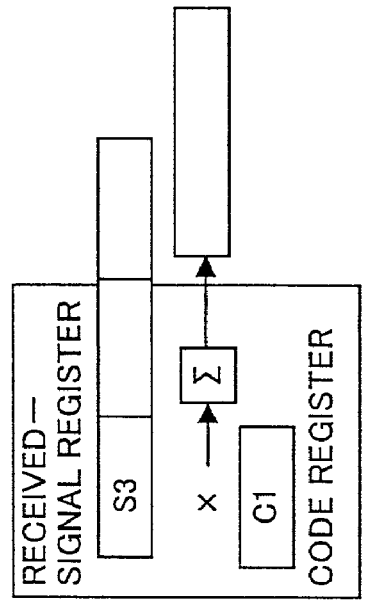

FIG. 14 is a block diagram showing a configuration of the path-search circuit according to a seventh embodiment of the present invention. In FIG. 14, the same elements as those of FIG. 7, FIG. 11, FIG. 12, and FIG. 13 are referred to by the same numerals. The path-search circuit of FIG. 14 includes a multiplex processing unit 80, selectors 81 through 83, delay-profile-holding units 84-1 through 84-N, a write-control circuit 85, a read-control circuit 86, signal-holding units 90-1 through 90-N, a write-control circuit 91, and a read-control circuit 92.

In this embodiment, the path-search circuit attends to time-division processing of received signals when demodulation of received signals is carried out with respect to a plurality of users 1 through N. Quadrature demodulated digital signals having in-phase components and quadrature components are supplied from demodulation units corresponding to N respective users, and are input to the signal-holding units 90-1 through 90-N. The write-control circuit 91 controls the write operation for writing signals in the received-signal-holding units 31 and 32, and the read-control circuit 92 controls the read operation for reading signals at speed N times faster than the sampling speed. The read signals are supplied to the selectors 81 and 82.

The selectors 81 and 82 successively select one of the signal-holding units 90-1 through 90-N, so that the in-phase components and the quadrature components of the received-signal sequence are supplied to the matched filters 36 and 37, respectively. The matched filters 36 and 37 multiply the received-signal sequence by the de-spreading-code sequence supplied from the codegeneration circuit 35. In this case, the codegeneration circuit 35 outputs the de-spreading-code sequence corresponding to the users 1 through N, and supplies them to the matched filters 36 and 37. The matched filters 36 and 37 may be provided with a plurality of code registers as shown in FIG. 4 or FIG. 6, such that these code registers are selectively chosen by selectors.

The in-phase-component circuit 38, the quadrature-component circuit 39, the power-conversion circuit 40, and the power-summation circuit 41 operate in the same manner as in the previous embodiments. Under the control of the write-control circuit 85, data is written in the delay-profile-holding units 84-1 through 84-N corresponding to the respective users 1 through N. The data-read operation is performed under the control of the read-control circuit 86. The selector 83 selects one of the delay profiles, and supplies the selected one to the path-timing-detection circuit 45. AS a result, the path-timing-detection circuit 45 can successively output path timings corresponding to the respective users 1 through N. This configuration makes it possible to carry out reception processing with respect to each of the users 1 through N.

The write-control circuits 91 and 85 may be either a time-sequence-order-write-control circuit or a chip-sequence-order-write-control circuit as described in the previous embodiments. By the same token, the read-control circuits 92 and 86 may be either a time-sequence-order-read-control circuit or a chip-sequence-order-read-control circuit as described in the previous embodiments. The matched filters 36 and 37 may have the configuration as shown in FIG. 6.

This embodiment has been described with reference to the case in which the delay-profile-holding units 84-1 through 84-N and the signal-holding units 90-1 through 90-N are provided for the respective users 1 through N. Alternatively, signal-holding units and delay-profile-holding units may be provided for respective different received-signal sequences of a single user (e.g., received-signal sequences of different branches or different sectors), so that path timings are obtained for the respective received-signal sequences. Such configuration makes it possible to attend to RAKE synthetic processing in an effective manner.

As described above, the path-search circuit of the present invention includes the received-signal registers 1 and 2 for receiving the signal sequences r1(t) and r2(t), the code register 4 for storing the de-spreading-code sequence c(t), the multiplication circuit 5, the summation circuit 6, and the selector 3 for selecting one of the received-signal registers 1 and 2 and for connecting the selected one to the multiplication circuit 5. When the received-signal registers 1 and 2 are used for two received-signal sequences, for example, successive register selection by the selector 3 makes it possible to make shared use of the same circuitry for the two different received-signal sequences. Since there is no need to make initial settings, this configuration can output a continuous stream of correlation values.

Moreover, the received-signal sequences may be converted into k signal sequences where k indicates the over-sample ratio, and these k signal sequences are supplied to the matched filters. In this configuration, it suffices if the received-signal registers of the matched filters have only m stages where m indicates the spreading factor. This helps to reduce circuit size. Further, the matched filters may be used in a time-divided fashion with respect to a plurality of received-signal sequences, so that path-timing signals for the plurality of received-signal sequences can be obtained without an increase in circuit size.

Further, the present invention is not limited to these embodiments, but various variations and modifications may be made without departing from the scope of the present invention.

The present application is based on Japanese priority application No. 11-353923 filed on Dec. 14, 1999, with the Japanese Patent Office, the entire contents of which are hereby incorporated by reference.

What is claimed is:

1. An apparatus, comprising:
a plurality of received-signal registers which receive and store therein a plurality of respective received-signal sequences;
a first selector which selects one of the received signal sequences stored in said received-signal registers;
at least one code register which stores therein a de-spreading-code sequence;
a multiplication circuit which multiplies the selected one of the received-signal sequences by the de-spreading-code sequence; and
a summation circuit which obtains a sum of results of the multiplication to obtain a correlation between the selected one of the received-signal sequences and the de-spreading-code sequence;
wherein said at least one code register includes a first code register storing a first de-spreading code and a second code register storing a second de-spreading code, wherein the pattern of the first de-spreading code and the pattern of the second de-spreading code are different, and said apparatus further comprising a second selector which selects one of said first code register and said second code register to select and supply the de-spreading-code sequence to the multiplication circuit, and
wherein while the correlation between the selected received signal sequences of the selected received-signal register and the selected one of the de-spreading-code patterns is being obtained, a received signal sequences of another received-signal registers of the plurality of received signal registers is replaced.

2. The apparatus as claimed in claim 1, further comprising:
a delay-profile-holding unit which generates a delay profile based on correlations obtained by the summation circuit; and
a path-timing-detection circuit which detect a path timing by detecting a peak of the delay profile.

3. An apparatus, comprising:
a plurality of received-signal registers which receive and store therein a plurality of respective received-signal sequences;
a selector which selects one of the received signal sequences stored in said received-signal registers;
at least one code register which stores therein a de-spreading-code sequence;
a multiplication circuit which multiplies the selected one of the received-signal sequences by the de-spreading-code sequence;
a summation circuit which obtains a sum of results of the multiplication to obtain a correlation between the selected one of the received-signal sequences and the de-spreading-code sequence
a delay-profile-holding unit which generates a delay profile based on correlations obtained by the summation circuit;
a path-timing-detection circuit which detect a path timing by detecting a peak of the delay profile;
a first sequence-order-control circuit which converts a single received-signal sequence arranged in a first order into k received-signal sequences arranged in a second order where k is an integer more than one, the k received-signal sequences being supplied to said plurality of received-signal registers; and
a second sequence-order-control circuit which converts the delay profile from one corresponding to the second order to one corresponding to the first order.

4. The apparatus as claimed in claim 3, wherein the single received-signal sequence has a spreading factor m, where m is an integer, and an over-sample ratio that is equal to k, and each of the k received-signal sequences has m samples therein, and wherein each of said plurality of received-signal registers has m stages.

5. An apparatus, comprising:
a plurality of received-signal registers which receive and store therein a plurality of respective received-signal sequences;
a first selector which selects one of the received signal sequences stored in said received-signal registers;
at least one code register which stores therein a de-spreading-code sequence;
a multiplication circuit which multiplies the selected one of the received-signal sequences by the de-spreading-code sequence;
a summation circuit which obtains a sum of results of the multiplication to obtain a correlation between the selected one of the received-signal sequences and the de-spreading-code sequence;
N received-signal-holding units which hold therein N received-signal sequences, where N is an integer;
a second selector which successively selects one of said N received-signal-holding units, and supplies the successively selected one of the N received-signal sequences to said plurality of received-signal registers at a speed N times faster than sampling speed of the N received-signal sequences;
N delay-profile-holding units which generate N delay profiles corresponding to the N received-signal sequences based on correlations obtained by the summation circuit;
a third selector which successively selects one of said N delay-profile-holding units, and supplies the successively selected one of the N delay profiles; and
a path-timing-detection circuit which detect a path timing by detecting a peak of the successively selected one of the N delay profiles.

6. An apparatus for obtaining a correlation wherein a carrelation calculating unit calculates the correlation while shifting, relative to a de-spreading code, a phase of received signal spread by a spreading code, comprising:
a first shift register configured to store a first received signal;
a second shift register configured to store a second received signal;
a selector unit configured to selectively output one of the first received signal and the second received signal; and
a control unit configured to cause said selector unit to output the first received signal and to cause the correlation calculating unit to calculate a correlation with respect to the first received signal, followed by causing said selector unit to output the second received signal and by causing the correlation calculating unit to calculate a correlation with respect to the second received signal;
wherein the first received signal is a signal spread by a first spreading code and the second received signal is a signal spread by a second spreading code, said apparatus further comprising:
a de-spreading code selecting unit configured to select a first de-spreading code from a first code register, said first de-spreading code corresponding to the first spreading code for correlation calculation of the first received signal, and to select a second de-spreading code from a second code register, said second de-spreading code corresponding to the second spreading code for correlation calculation of the second received signal, such that each of a pattern of the first spreading code and a pattern of the second spreading code are different,
wherein said second shift register shifts second received signal to set the second received signal to a predetermined phase while correlation calculation is being performed for the first received signal.

7. An apparatus for obtaining a correlation wherein a correlation calculating unit calculates the correlation while shifting, relative to a de-spreading code, a phase of a signal spread by a spreading code, comprising:
a first shift register configured to store a first received signal;
a second shift register configured to store a second received signal;
a selector unit configured to selectively output one of the first received signal and the second received signal; and
a control unit configured to cause said selector unit to output the first received signal and to cause the correlation calculating unit to calculate a correlation with respect to the first received signal, followed by causing said selector unit to output the second received signal and by causing the correlation calculating unit to calculate a correlation with respect to the second received signal,
wherein a received signal is oversampled and picked every few samples to generate two or more sequences, and wherein the first received signal is a first one of the two or more sequences and the second received signal is a second one of the two or more sequences, the correlation calculations of the first received signal and the second received signal being preformed by use of a common de-spreading code, and
wherein said second shift register shifts the second received signal to set the second received signal to a predetermined phase while correlation calculation is being performed for the first received signal.

* * * * *